(12) United States Patent
Sampei et al.

(10) Patent No.: US 8,634,156 B2
(45) Date of Patent: Jan. 21, 2014

(54) STORAGE SYSTEM, STORAGE CONTROL APPARATUS, AND STORAGE CONTROL METHOD

(75) Inventors: Akira Sampei, Kawasaki (JP); Tsunemichi Harada, Kawasaki (JP); Hiroaki Sato, Kawasaki (JP); Fumio Hanzawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 67 days.

(21) Appl. No.: 13/367,654

(22) Filed: Feb. 7, 2012

(65) Prior Publication Data

US 2012/0250179 A1  Oct. 4, 2012

(30) Foreign Application Priority Data

Mar. 30, 2011  (JP) ................................ 2011-073969

(51) Int. Cl.
G11B 19/28  (2006.01)

(52) U.S. Cl.
USPC ...................................................... 360/73.02

(58) Field of Classification Search
USPC .............. 360/69, 73.03, 77.02; 711/154, 161, 711/162, 112, 103, 114, 170; 714/773, 632, 714/324, 6.32; 710/5, 74, 59, 58; 713/324
See application file for complete search history.

(56) References Cited

U.S. PATENT DOCUMENTS

| | | | | |
|---|---|---|---|---|
| 7,283,319 B2 * | 10/2007 | Hobbet et al. | ................. | 360/75 |
| 7,440,215 B1 * | 10/2008 | Sardella et al. | ................. | 360/69 |
| 7,516,348 B1 * | 4/2009 | Ofer | .............................. | 713/324 |
| 7,953,939 B2 * | 5/2011 | Nakamura et al. | ........... | 711/154 |
| 8,219,748 B2 * | 7/2012 | Uehara et al. | ................ | 711/114 |

FOREIGN PATENT DOCUMENTS

| | | |
|---|---|---|
| JP | 2006-133926 A | 5/2006 |
| JP | 2007-122263 A | 5/2007 |
| JP | 2007-304728 | 11/2007 |

* cited by examiner

Primary Examiner — Nabil Hindi
(74) Attorney, Agent, or Firm — Fujitsu Patent Center

(57) ABSTRACT

In a storage system, when power supply to HDDs is instantaneously interrupted, a spin up controller of a magnetic disk apparatus spins up the HDDs. On the other hand, based on a response for an access to the HDDs in the magnetic disk apparatus, when detecting that the HDDs as an access destination are spun down, a spin up controller of a control apparatus spins up the HDDs. When a certain number of the HDDs or more are spun down, a separate controller does not permit the magnetic disk apparatus to be used for a given length of time. While the magnetic disk apparatus is not permitted to be used, the HDDs are spun up by using the spin up controller of the magnetic disk apparatus.

17 Claims, 18 Drawing Sheets

220 DEVICE MANAGEMENT TABLE

| DEVICE NAME | | | DEVICE STATUS |
|---|---|---|---|
| DE Loop#0 | DE#00 | IOM#000 | 1 |
| | | IOM#001 | 1 |
| | | Disk#000 | 1 |
| | | Disk#001 | 1 |
| | | ⋮ | ⋮ |
| | DE#01 | IOM#100 | 1 |
| | | IOM#101 | 1 |
| | | Disk#100 | 1 |
| | | ⋮ | ⋮ |
| | DE#02 | ⋮ | ⋮ |
| DE Loop#1 | ⋮ | ⋮ | ⋮ |

230 RAID MANAGEMENT TABLE

| RAID GROUP NUMBER | RAID LEVEL | USING DISK | DEVICE STATUS | REDUNDANCY STATUS | OPERATION PROPRIETY STATUS | LOGICAL VOLUME INFORMATION |
|---|---|---|---|---|---|---|
| RLU#00 | RAID5 | Disk#000 | 1 | 1 | 1 | LU#00 : ···· |
|  |  | Disk#001 | 1 |  |  | LU#01 : ···· |
|  |  | Disk#002 | 1 |  |  | ⋮ |
|  |  | Disk#003 | 1 |  |  |  |
| RLU#01 | ··· | ··· | ··· | ··· | ··· | ··· |
| ··· | ··· | ··· | ··· | ··· | ··· | ··· |

ําเนStorage System, Storage Control Apparatus, and Storage Control Method

STORAGE SYSTEM, STORAGE CONTROL APPARATUS, AND STORAGE CONTROL METHOD

CROSS-REFERENCE TO RELATED APPLICATION

This application is based upon and claims the benefit of priority of the prior Japanese Patent Application No. 2011-073969, filed on Mar. 30, 2011, the entire contents of which are incorporated herein by reference.

FIELD

The embodiments discussed herein are related to a storage system, a storage control apparatus, and a storage control method.

BACKGROUND

When a hard disk drive (HDD) fails to be accessed for a long time or power supply is temporarily broken, rotation of a magnetic disk is stopped, that is, the magnetic disk is "spun down". At the time when an HDD is spun down, when a control device transmits to the HDD a command for requesting it to be spun up, operation of the HDD is restored.

On the other hand, as a control technology at the time when a malfunction occurs in a storage device such as an HDD, the following technology is used. Examples of the control technology includes a control device which is connected to a plurality of HDDs and a storage device including a voltage monitoring function of a power supply line to the HDDs, when reduction in a voltage of the power supply line is detected, temporarily breaks a data line to the storage device, and transmits a start-up command to the HDDs after voltage restoration.

Further, as another example, there is used a control device which, when detecting reduction in a DC voltage supplied to an HDD, stores power supply failure information in redundant arrays of inexpensive disks (RAID) configuration information as well as interrupts reading and writing in the HDD and, when detecting restoration of the DC voltage, releases the power supply failure information from the RAID configuration information as well as resumes the reading and writing in the HDD.

In addition, as another example, there is used a control device which classifies each disk belonging to a RAID group into multiple categories for each RAID group as a closure determination object every time an event to determine whether to close the RAID occurs in a RAID device, and based on a count result of the number of corresponding disks in units of classifications, determines whether to close the RAID group.

Japanese Laid-open Patent Publication No. 2006-133926
Japanese Laid-open Patent Publication No. 2007-122263
Japanese Laid-open Patent Publication No. 2007-304728

Incidentally, in a storage system, a plurality of HDDs may be connected to a control device. The storage system including the plurality of HDDs is configured so that spun down HDDs may be restored under the control of the control device. In the above case, when the plurality of HDDs are spun down at one time, a processing load of the control device increases because of restoration processing of the HDDs. When the processing load of the control device increases because of the restoration processing of the spun down HDDs, access processing to HDDs which are not spun down grows stagnant. Alternatively, the time necessary for restoring each of the spun down HDDs becomes longer.

SUMMARY

According to an aspect, there is provided a storage system which includes a magnetic disk apparatus including a plurality of magnetic disk drives; and a control apparatus which controls an access to a magnetic disk drive in the magnetic disk apparatus, wherein: the magnetic disk apparatus has a first spin up controller which spins up a spun down magnetic disk drive in the magnetic disk apparatus; and the control apparatus has a second spin up controller which spins up a spun down magnetic disk drive in the magnetic disk apparatus; and a separate controller which does not permit the magnetic disk apparatus to be used when the number of the spun down magnetic disk drives in the magnetic disk apparatus reaches a predetermined threshold and permits the magnetic disk apparatus to be used after a predetermined period of time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of information registered in a device management table;
FIG. 7 illustrates an example of information registered in a RAID management table.

DESCRIPTION OF EMBODIMENTS

Figure 1:
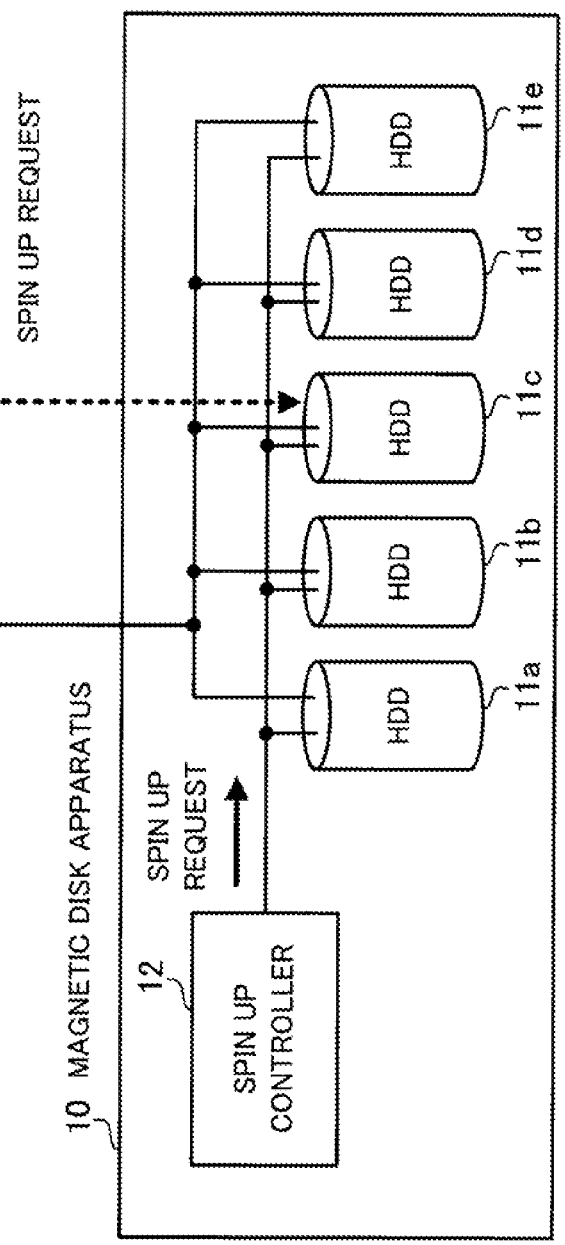
FIG. 1 illustrates a configuration example of a storage system according to a first embodiment.

Several embodiments will be described below with reference to the accompanying drawings, wherein like reference numerals refer to like elements throughout.

First Embodiment

FIG. 1 illustrates a configuration example of a storage system according to a first embodiment.

The storage system 1 illustrated in FIG. 1 includes a magnetic disk apparatus 10 including a plurality of HDDs 11a to 11e and a control apparatus 20 which controls an access to the HDDs 11a to 11e in the magnetic disk apparatus 10. Note that the number of the HDDs included in the magnetic disk apparatus 10 is not limited to five sets as in FIG. 1.

The magnetic disk apparatus 10 includes a spin up controller 12. The spin up controller 12 spins up a spun down HDD in the magnetic disk apparatus 10. For example, when a power supply voltage supplied to the HDDs 11a to 11e rises up from a voltage less than a predetermined threshold voltage up to a voltage equal to or more than the threshold voltage, the spin up controller 12 requests the HDD in the magnetic disk apparatus 10 to be spun up. In this case, the spin up controller 12 may request all the HDDs 11a to 11e in the magnetic disk apparatus 10 to be spun up.

On the other hand, the control apparatus 20 includes a spin up controller 21 and a separate controller 22. Processing of the spin up controller 21 and the separate controller 22 is realized, for example, by executing a predetermined program through a central processing unit (CPU) included in the control apparatus 20.

The spin up controller 21 spins up a spun down HDD in the magnetic disk apparatus 10. Based on a response for an access to an HDD in the magnetic disk apparatus 10, for example, when determining that an HDD as an access destination is spun down, the spin up controller 21 requests the HDD as an access destination to be spun up. At the time of accessing the HDD 11c in the magnetic disk apparatus 10, for example, when determining that the HDD 11c is spun down, the spin up controller 21 requests the HDD 11c to be spun up as illustrated by a dotted arrow of FIG. 1.

When the number of the spun down HDDs in the magnetic disk apparatus 10 reaches a predetermined threshold, the separate controller 22 does not permit the magnetic disk apparatus 10 to be used. After a predetermined period of time, the separate controller 22 permits the magnetic disk apparatus 10 to be used. Here, while the separate controller 22 does not permit the magnetic disk apparatus 10 to be used, the spin up controller 21 is unable to request the HDD to be spun up. However, through processing of the spin up controller 12 in the magnetic disk apparatus 10, the spun down HDD is spun up. The time at which the separate controller 22 does not permit the magnetic disk apparatus 10 to be used is set equal to or more than the time at which the HDD is spun up under the control of the spin up controller 12 of the magnetic disk apparatus 10. Through the above process, after the separate controller 22 permits the magnetic disk apparatus 10 to be used again, the control apparatus 20 accesses the HDDs 11a to 11e in the magnetic disk apparatus 10 at once.

Suppose that when the plurality of the HDDs in the magnetic disk apparatus 10 are spun down, the spin up controller 21 of the control apparatus 20 requests each of the spun down HDDs to be spun up. Therefore, as the HDDs are more spun down, a processing load of the control apparatus 20 becomes larger. For example, when the processing load of the control apparatus 20 becomes larger, the time necessary for spinning up a spun down HDD may become longer. Further, the other processing except processing for spinning up the HDD performed in the control apparatus 20 may grow stagnant.

As compared with the above process, according to the process of the separate controller 22, in the case where a certain number of the HDDs or more are spun down, they are spun up not by the processing of the spin up controller 21 of the control apparatus 20 but by the processing of the spin up controller 12 of the magnetic disk apparatus 10. This process permits the processing load of the control apparatus 20 to be relieved in the case where the plurality of the HDDs are spun down.

As described above, when a power supply voltage supplied to the HDDs 11a to 11e rises up from a voltage less than a predetermined threshold voltage up to a voltage equal to or more than the threshold voltage, the spin up controller 12 of the magnetic disk apparatus 10 may request the HDDs in the magnetic disk apparatus 10 to be spun up. In the above case, for example, the plurality of the HDDs in the magnetic disk apparatus 10 are supposed to be spun down due to temporary reduction in the power supply voltage supplied to the magnetic disk apparatus 10. In this case, the plurality of the HDDs are spun up without increasing the processing load of the control apparatus 20.

On the other hand, as described above, based on the response for an access to HDDs in the magnetic disk apparatus 10, when determining that the HDDs as an access destination are spun down, the spin up controller 21 of the control apparatus 20 may request the HDDs as an access destination to be spun up. Further, when the number of the HDDs determined to be spun down by the above spin up controller 21 reaches a predetermined threshold, the separate controller 22 need not permit the magnetic disk apparatus 10 to be used. Suppose, for example, that a small number of the HDDs are spun down because of temporary and unserious malfunction. In the above case, according to each processing of the above spin up controller 21 and separate controller 22, the entire magnetic disk apparatus 10 is kept in a usable state and access processing to the spun up HDDs in the magnetic disk apparatus 10 is continued.

For example, when the number of the spun down HDDs in the magnetic disk apparatus 10 reaches a predetermined threshold, the separate controller 22 need not permit the communication interface circuit communicating with the control apparatus 20 included in the magnetic disk apparatus 10 to be used. Through the above process, when the plurality of the HDDs are spun down, the control apparatus 20 spins up a plurality of the spun down HDDs based on a simple processing that an interface circuit in the magnetic disk apparatus 10 is not permitted to be used.

Second Embodiment

Figure 2:
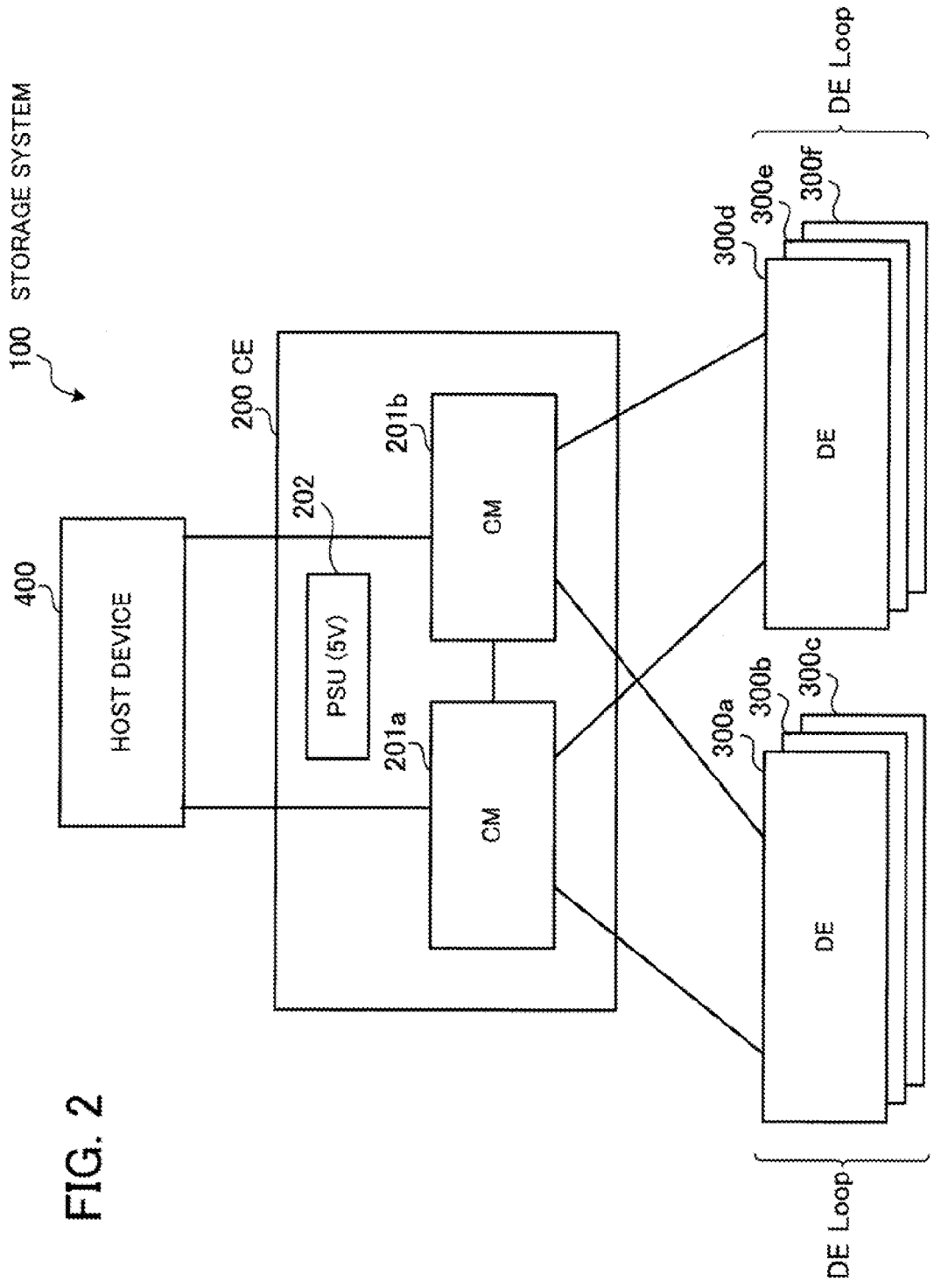
FIG. 2 illustrates a system configuration example of a storage system according to a second embodiment.

FIG. 2 illustrates a system configuration example of a storage system according to a second embodiment. The storage system 100 illustrated in FIG. 2 includes a controller enclosure (CE) 200, drive enclosures (DEs) 300a to 300f, and a host device 400.

The CE 200 includes controller modules (CMs) 201a and 201b, and a power supply unit (PSU) 202. Each of the CMs 201a and 201b reads/writes data from/in HDDs in the DEs 300a to 300f according to a request from the host device 400. The CMs 201a and 201b manage by RAIDs physical storage areas realized by the HDDs in the DEs 300a to 300f, and control an access to these physical storage areas.

In addition, only one CM may be provided in the CE 200, or three or more CMs may be provided therein. Note that when a plurality of the CMs are provided, an access control system to the DEs 300a to 300f is made redundant and reliability of access control processing is improved.

The PSU 202 supplies a power supply to the CMs 201a and 201b. As an example of the present embodiment, the PSU 202 supplies a DC power supply of 5 V to the CMs 201a and 201b.

Each of the DEs 300a to 300f includes a plurality of storage devices as access control objects from the CMs 201a and 201b. In the present embodiment, each of the DEs 300a to 300f serves as a disk array device including HDDs as the storage device. In addition, as the storage devices included in the DEs 300a to 300f, other types of nonvolatile memory devices such as solid state drives (SSDs) is also used.

The HDDs in the DEs 300a to 300f communicate with the CMs 201a and 201b, for example, in accordance with a serial attached SCSI (SAS, SCSI: Small Computer System Interface) standard. Here, the DEs 300a to 300c and DEs 300d to 300f each constitute one "DE loop". The "DE loop" is one group of the DEs serially connected to each of the CMs 201a and 201b. A connection relationship between this DE loop and the CM will be described later with reference to FIG. 5.

Suppose, for example, that in the present embodiment, six Des each including six HDDs are provided, and two DE loops each including three DEs are provided. Further, the number of the HDDs in the DE, the number of the provided DEs, the number of the DEs included in the DE loop, and the number of the DE loops may be larger. For example, the maximum number of the HDDs mounted on one DE may be set to 24, the maximum number of the DEs provided on the storage system may be set to 40, and the maximum number of the DEs included in the DE loop may be set to 10. In this case, 960 HDDs are connected to the storage system.

According to an operation of a user, the host device 400 requests the CMs 201a and 201b to access the HDDs in the DEs 300a to 300f. In addition, the host device 400 and the CMs 201a and 201b are connected, for example, via a fibre channel (FC) cable.

Figure 3:
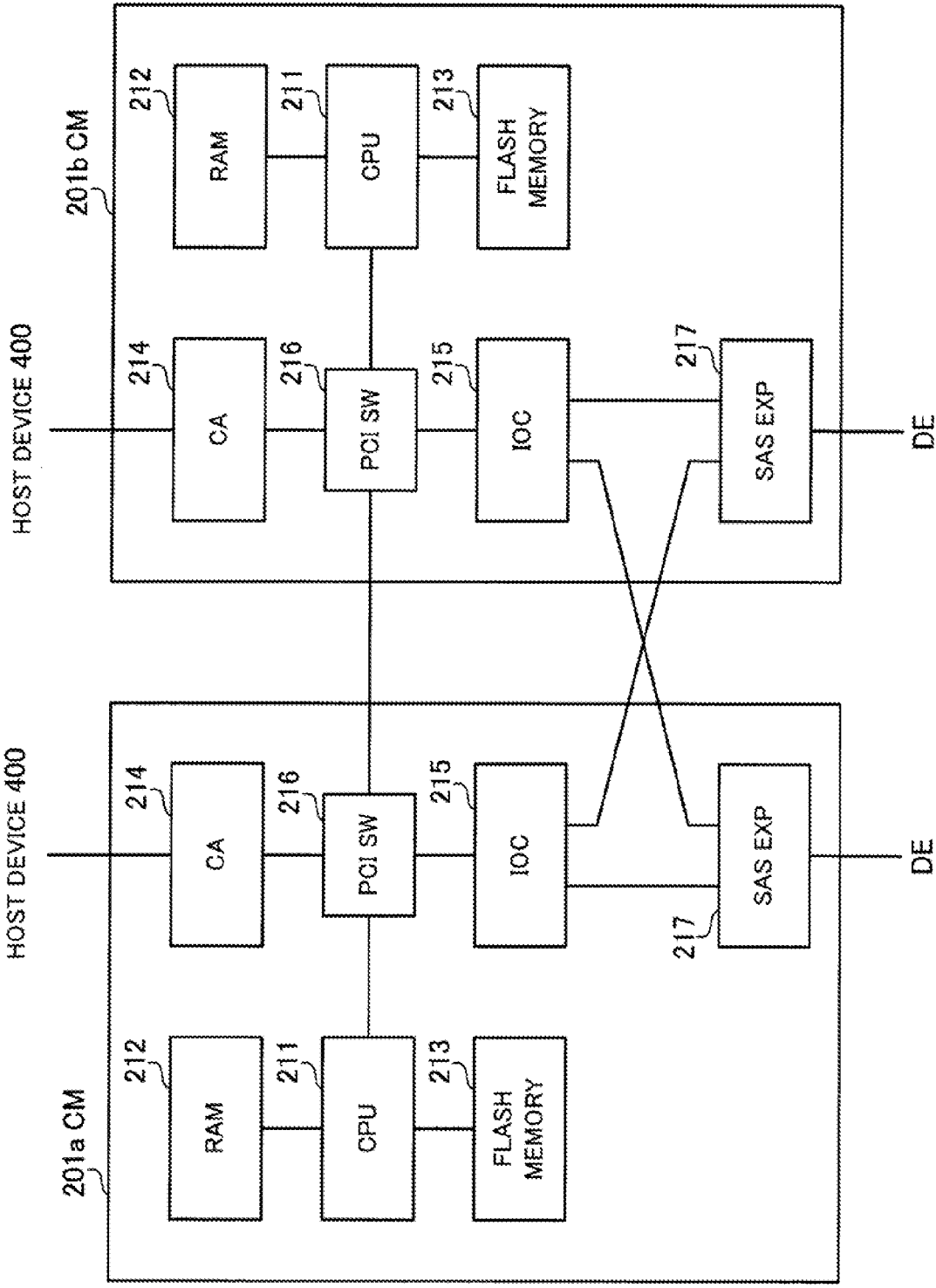
FIG. 3 illustrates a hardware configuration example of a CM.

FIG. 3 illustrates a hardware configuration example of the CM. Since the CMs 201a and 201b have the same hardware configuration as each other, only a configuration of the CM 201a will be mainly described below.

The entire CM 201a is controlled by a CPU 211. To the CPU 211, a RAM 212 and a plurality of peripheral devices are connected. The RAM 212 is used as a main storage unit of the CM 201a, and temporarily stores at least a part of a program executed by the CPU 211 and various data necessary for processing based on the above program.

To the CPU 211, a flash memory 213, a channel adapter (CA) 214, and an in/out controller (IOC) 215 are connected as an example of the peripheral device. The flash memory 213 is connected to the CPU 211, for example, via a platform controller hub (PCH) (not illustrated). Further, the CA 214 and the IOC 215 are connected to the CPU 211, for example, via a peripheral component interconnect (PCI) switch 216.

The flash memory 213 is used as a secondary storage device of the CM 201a, and stores a program executed by the CPU 211 and various data necessary for the execution. In addition, examples of the secondary storage device may include other types of nonvolatile storage devices such as an HDD.

The CA 214 performs interface processing for transmitting and receiving data between the host device 400 and the CM 201a.

The IOC 215 is a circuit for performing SAS interface processing. The IOC 215 of the CM 201a is connected to both of one SAS expander 217 provided on the CM 201a and the other SAS expander 217 provided on the CM 201b. In the same manner, also the IOC 215 of the CM 201b is connected to both of the one SAS expander 217 provided on the CM 201a and the other SAS expander 217 provided on the CM 201b. Both of the one SAS expander 217 provided on the CM 201a and the other SAS expander 217 provided on the CM 201b each are connected to one DE constituting the DE loop.

In addition, one PCI switch 216 of the CM 201a is connected to the other PCI switch 216 of the CM 201b. One CPU 211 of the CM 201a and the other CPU 211 of the CM 201b are configured so as to transmit and receive data mutually through a communication route connecting the one PCI switch 216 of the CM 201a and the other PCI switch 216 of the CM 201b.

Figure 4:
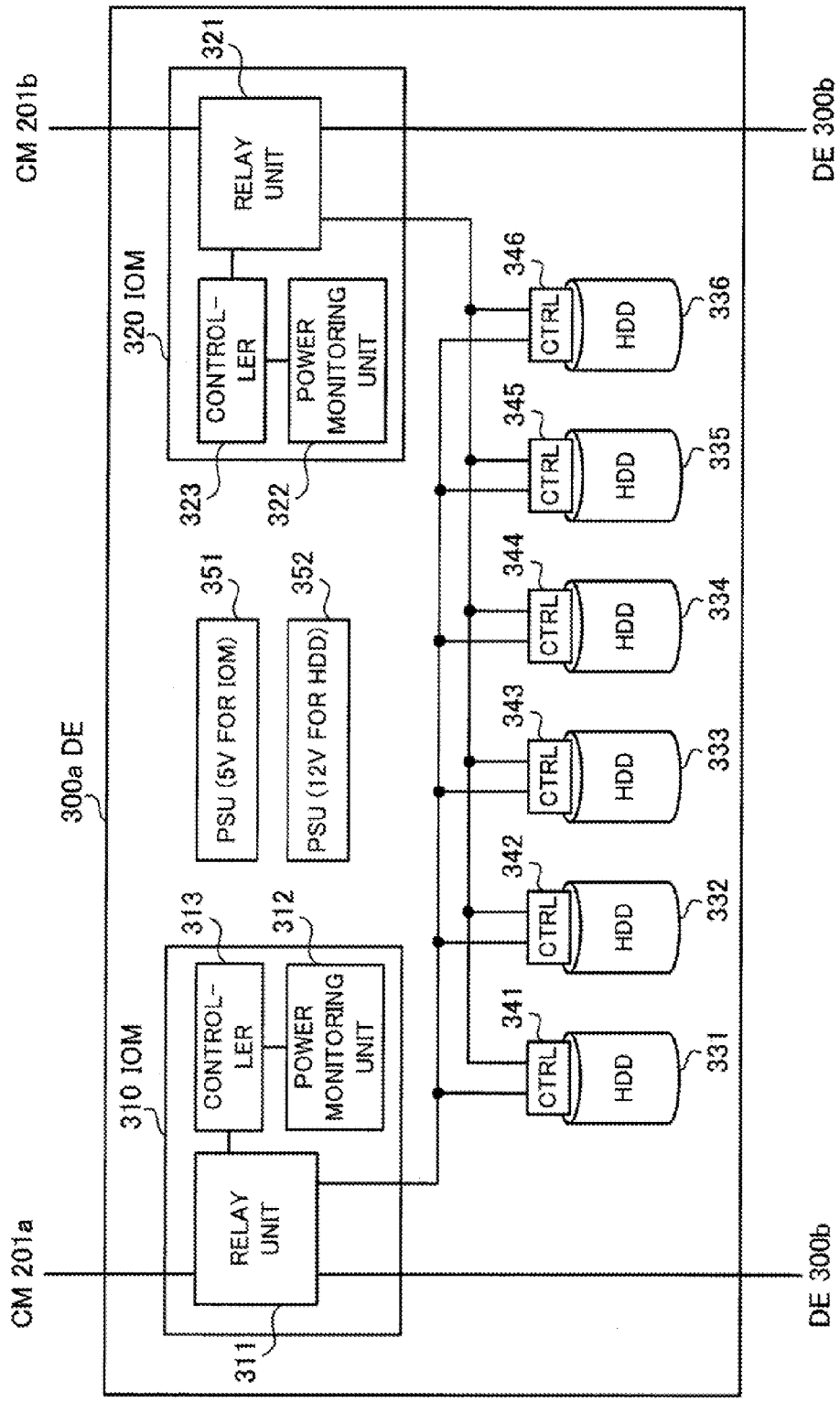
FIG. 4 illustrates a hardware configuration example of a DE.

FIG. 4 illustrates a hardware configuration example of the DE. Since the DEs 300a to 300f each have the same hardware configuration as each other, FIG. 4 typically illustrates a configuration of the DE 300a.

The DE 300a includes in/out modules (IOMs) 310 and 320, HDDs 331 to 336, and PSUs 351 and 352.

The IOMs 310 and 320 totally control the DE 300a as well as perform processing as a SAS expander. The IOM 310 includes a relay unit 311, a power monitoring unit 312, and a controller 313. The IOM 320 includes a relay unit 321, a power monitoring unit 322, and a controller 323.

In the IOM 310, the relay unit 311 is connected to the SAS expander 217 of the CM 201a, the HDDs 331 to 336 in the DE 300a, and a relay unit of another DE (DE 300b) belonging to the same DE loop as that of the DE 300a, and relays data among the above connected devices.

The power monitoring unit 312 monitors a power supply voltage supplied to the HDDs 331 to 336 in the DE 300a through the PSU 352, detects instantaneous interruption of power supply (namely, phenomenon that power supply is stopped and restored in a given period of time), and then notifies the controller 313 of the above effect.

The controller 313 performs processing of controlling the entire DE 300a and processing of controlling a relay operation of the relay unit 311. As one of the control processing of the entire DE 300a, when the power monitoring unit 312 detects an instantaneous interruption of power supply, the controller 313 performs "automatic spin up processing" of requesting the HDDs 331 to 336 in the DE 300a to be spun up.

The relay unit 321, power monitoring unit 322, and controller 323 of the IOM 320 perform the same processing as that of the relay unit 311, power monitoring unit 312, and controller 313 of the IOM 310, respectively. The relay unit 321 is connected to the SAS expander 217 of the CM 201b, the HDDs 331 to 336 in the DE 300a, and a relay unit of the another DE (DE 300b) belonging to the same DE loop as that of the DE 300a. A control function of the DE 300a through the power monitoring unit 322 and the controller 323 functions as a waiting system, for example, when the IOM 310 performs a normal operation as an operating system.

The HDDs 331 to 336 have controller circuits 341 to 346 which perform the SAS interface processing, respectively. According to a command received from an access source (the CM 201a or 201b), the controller circuits 341 to 346 each control an interior portion of the HDD as well as send back a response to the above command.

The PSU 351 supplies, for example, a DC power supply of 5 V to the IOMs 310 and 320. The PSU 352 supplies, for example, a DC power supply of 12 V to the HDDs 331 to 336. For the purpose of driving motors included in the HDDs 331 to 336, the PSU 352 outputs a power supply voltage larger than that of the PSU 351.

Figure 5:
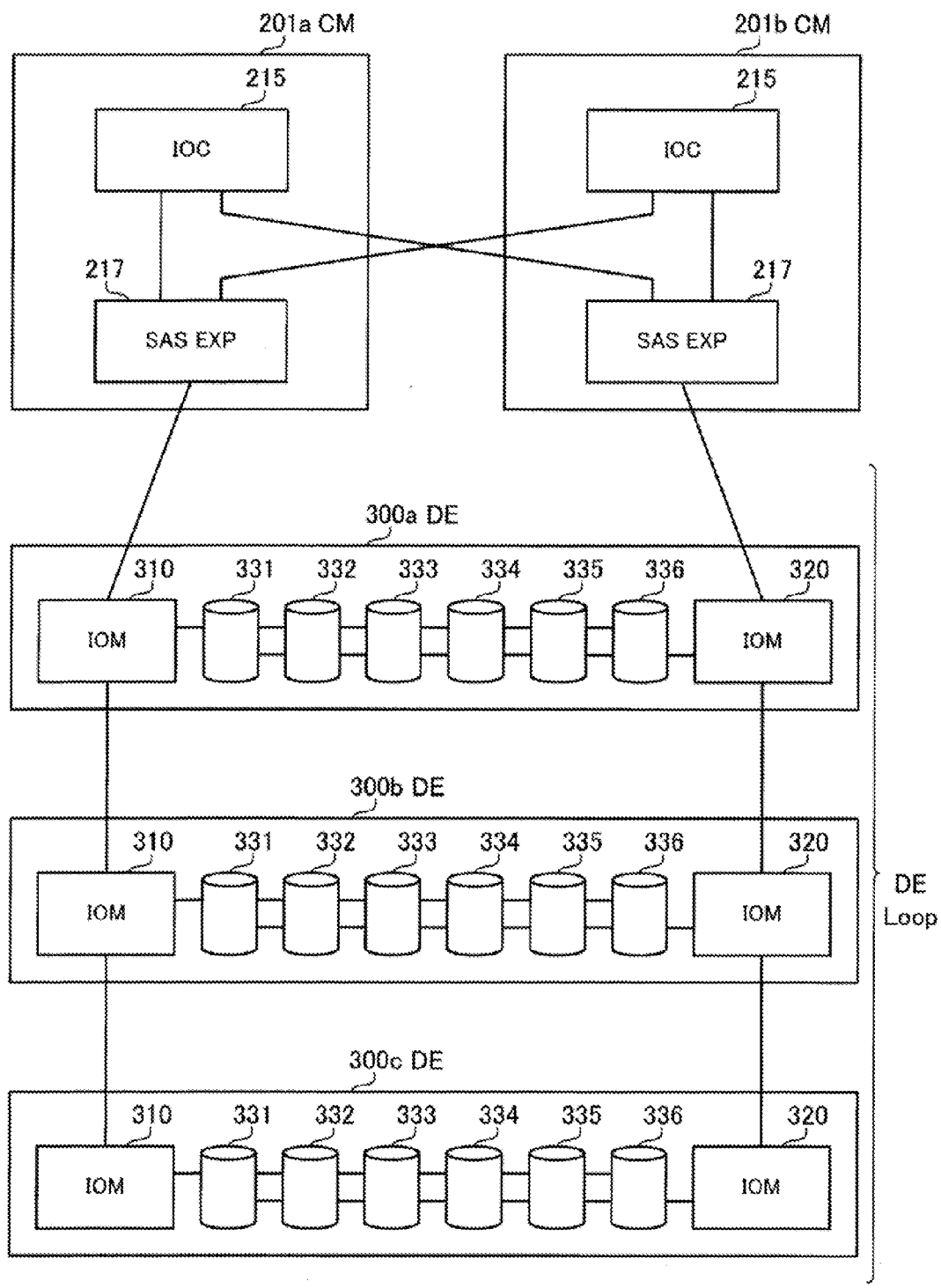
FIG. 5 illustrates a configuration example of a DE loop.

Here, FIG. 5 illustrates a configuration example of the DE loop.

As described above, in the storage system 100 according to the present embodiment, a plurality of the DEs constitute the DE loop. The DE loop is one group of the DEs serially connected to each of the CMs 201a and 201b, and the DEs 300a to 300c and DEs 300d to 300f each constitute the individual DE loop, as illustrated in FIG. 2.

As an example, FIG. 5 illustrates a connection relationship within the DE loop constituted by the DEs 300a to 300c. The IOM 310 of the DE 300a is connected to the SAS expander 217 of the CM 201a, and the IOM 320 of the DE 300a is connected to the SAS expander 217 of the CM 201b.

The IOM 310 of the DE 300b is connected to the SAS expander 217 of the CM 201a via the IOM 310 of the DE 300a. Further, the IOM 320 of the DE 300b is connected to the SAS expander 217 of the CM 201b via the IOM 320 of the DE 300a.

The IOM 310 of the DE 300c is connected to the SAS expander 217 of the CM 201a via the IOM 310 of the DE 300b and the IOM 310 of the DE 300a. The IOM 320 of the DE 300c is further connected to the SAS expander 217 of the CM 201b via the IOM 320 of the DE 300b and the IOM 320 of the DE 300a.

As can be seen from the above discussion, the DEs constituting the DE loop are connected to the CM via a serial transmission path.

In addition, the IOC 215 of the CM 201a accesses the HDDs included in the DEs 300a, 300b, and 300c via the one SAS expander 217 of the CM 201a. At the same time, the IOC 215 of the CM 201a accesses the HDDs included in the DEs 300a, 300b, and 300c via the other SAS expander 217 of the CM 201b. As described above, when a transmission path connecting the CM 201a and the DEs constituting the DE loop is made redundant, the reliability of the access processing from the CM 201a to each HDD in the DE loop is improved.

In the same manner, also in the CM 201b, a transmission path connecting the IOC 215 of the CM 201b and each DE in the DE loop is further made redundant into a route passing through the one SAS expander 217 of the CM 201b and a route passing through the other SAS expander 217 of the CM 201a. This feature improves reliability of the access processing from the CM 201b to each HDD in the DE loop.

Next, information stored in the CM 201a will be described. In the flash memory 213 included in the CM 201a, the device management table and the RAID management table are stored.

FIG. 6 illustrates an example of information registered in the device management table.

The device management table 220 is a table for storing information indicating a state of a device connected to the CM 201a. In the device management table 220, a "device status" is registered while associated with a "device name" identifying a device.

Examples of the device registered in the device name include the IOMs and HDDs in the DEs connected to the CM 201a. In the device management table 220, the IOMs and the HDDs are classified in each DE, and further the DEs are classified in each DE loop. For example, "DE #00", "DE #01", and "DE #02" of FIG. 6 correspond to the DEs 300a, 300b, and 300c of FIG. 2, respectively, and constitute one DE loop. Further, "IOM #000", "IOM #001", and "Disk #000" of FIG. 6 correspond to the IOM 310, IOM 320, and HDD 331 of the DE 300a, respectively.

The "device status" is flag information indicating whether the corresponding device is in a usable state. If the corresponding device is in the usable state, the "device status" is set to "1". On the other hand, if the corresponding device is in the unusable state, the "device status" is set to "0". When setting the "device status" from "1" to the CM 201a separates the corresponding device from itself. On the contrary, when setting the "device status" from "0" to "1", the CM 201a integrates the corresponding device into itself.

Also, the CM 201b holds the device management table 220 in which information as illustrated in FIG. 6 is registered. The CMs 201a and 201b may each hold, for example, the device management table 220 in which individual information is registered. Or, alternatively, the device management table 220 held by the CM 201a may be synchronized with the device management table 220 held by the CM 201b.

FIG. 7 illustrates an example of information registered in the RAID management table.

The RAID management table 230 is a table storing information relating to the RAID. In the RAID management table 230, a "RAID level", "using disk", "device status", "redundancy status", "operation propriety status", and "logical volume information" are registered while being associated with a "RAID group number" identifying a RAID group.

In the "RAID level", the RAID level set to the RAID group is registered.

In the "using disk", information identifying an HDD to be used in the RAID group is registered among the HDDs in the DEs 300a to 300f. In the "using disk", the plurality of the HDDs are normally registered with respect to one RAID group.

The "device status" is a flag indicating a state of the HDD indicated through the "using disk". A value to be registered in the "device status" is the same as that of the "device status" associated with the same HDD in the device management table 220.

The "redundancy status" indicates whether data has redundancy in the RAID group. If the data has redundancy, the "redundancy status" is set to "1". On the other hand, if the data has no redundancy, the "redundancy status" is set to "0". The "data has redundancy" is that even if any one of the plurality of the HDDs constituting a physical area of the RAID group is unusable, the data is restored. In the RAID management table 230, for example, the plurality of the HDDs are assumed to be associated with the RAID group in which any of RAIDs 1, 4, and 5 are set as the "RAID level". If even one of the "device statuses" is set to "0", the data has no redundancy.

The "operation propriety status" indicates whether the RAID group is operated. If the RAID group is operated, the "operation propriety status" is set to "1". On the other hand, if the RAID group is unable to be operated, the "operation propriety status" is set to "0". Whether the RAID group is operated is fundamentally determined by the number of the HDDs in which the "device status" is set to "0" among the HDDs constituting the RAID group. In the RAID management table 230, for example, when the "device status" is set to "0" with regard to two or more HDDs among the plurality of the HDDs associated with the RAID group in which any of the RAIDs 1, 4, and 5 are set as the "RAID level", the RAID group is unable to be operated.

Suppose, in addition, that in the RAID group in which any of the RAIDs 1, 4, and 5 are set as the "RAID level", only one HDD in which the "device status" is set to "0" is indicated. In the above case, although the "redundancy status" is set to the "operation propriety status" is set to "1". In this case, while the data has no redundancy, the RAID group is continued to be operated.

In the "logical volume information", information relating to the logical volume set to the RAID group is registered. Examples of the information relating to the logical volume include number of the set logical volume and position information in a physical area in the HDD used as the logical volume.

Figure 8:
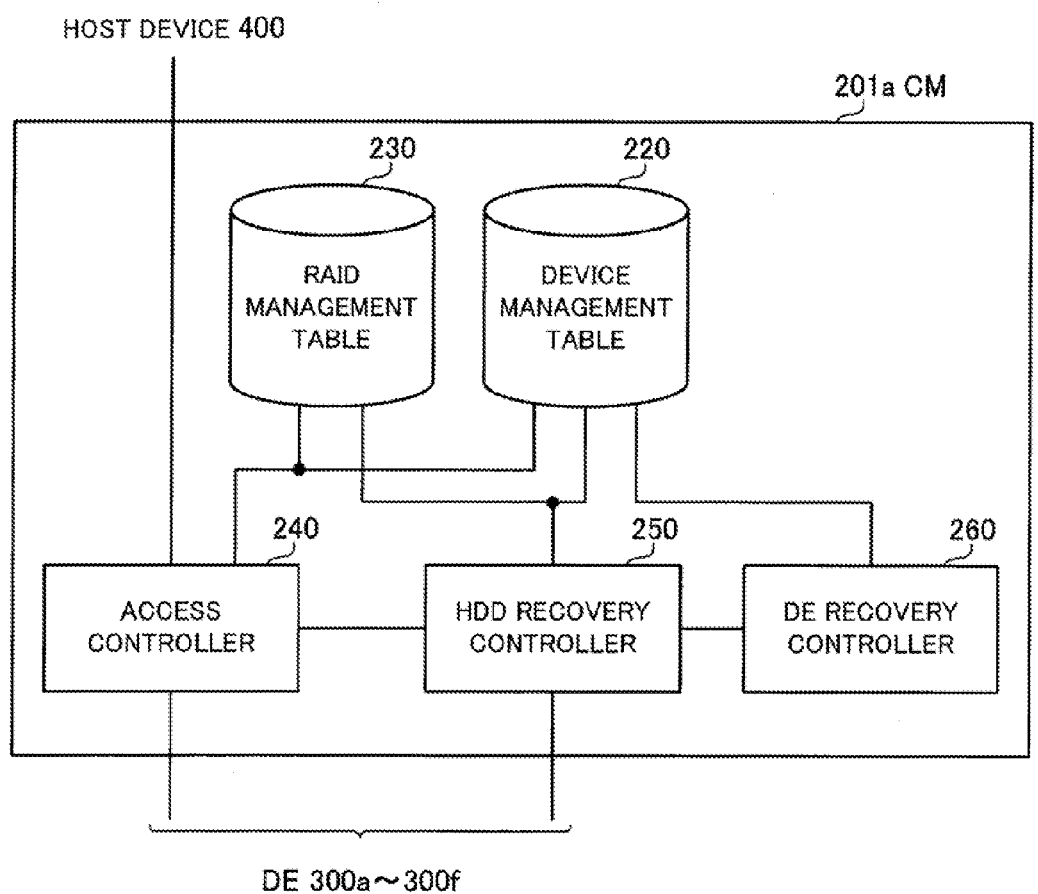
FIG. 8 is a block diagram illustrating an example of a processing function included in a CM.

Next, FIG. 8 is a block diagram illustrating an example of a processing function included in the CM. Since both of the CMs 201a and 201b perform the same processing, the CM 201a will be typically described below.

The CM 201a includes an access controller 240, an HDD recovery controller 250, and a DE recovery controller 260. Processing of the access controller 240, HDD recovery controller 250, and DE recovery controller 260 is realized, for example, by executing a predetermined program through the CPU 211 of the CM 201a.

The access controller 240 accesses the HDDs in the DEs 300a to 300f according to a request from the host device 400. The access controller 240 receives an access request to data included in the logical volume set in the RAID management table 230 from the host device 400. Further, the access controller 240 accesses data in which the access is requested based on information registered in the "logical volume information" of the RAID management table 230.

Based on the information stored in the RAID management table 230, the access controller 240 further manages data recorded in the HDDs in the DEs 300a to 300f by using the RAID. When receiving an access request of data, the access controller 240 controls an access to the HDD based on the "device status", "redundancy status", and "operation propriety status" in the RAID management table 230.

For example, when any of the RAIDs 4 and 5 are set as the "RAID level", data read-out processing is performed as follows. Note that only when the "operation propriety status" is set to "1", the access controller 240 accesses data within the logical volume included in the RAID group.

When the "device statuses" of all the HDDs indicated by the "using disk" are set to "1" and both of the "redundancy status" and the "operation propriety status" are set to "1", the access controller 240 reads out data from any of the HDDs indicated by the "using disk".

When the "device status" of one HDD is set to "0", the "redundancy status" of the HDD is set to "0", and the "operation propriety status" of the HDD is set to "1" among the HDDs indicated by the "using disk", the access controller 240 performs any of the next data read-out processing. The access controller 240 reads out data from any of the HDDs the "device status" of which is set to "1" among the HDDs indicated by the "using disk". Alternatively, the access controller 240 reads out data and parity from all the HDDs the "device status" of which is set to "1" among the HDDs indicated by the "using disk", and restores data to be read out based on the read out data and parity.

Further, when transmitting a command for requesting write-in or read-out to the HDDs, the access controller 240 determines, based on sense information sent back from the HDDs, that the HDDs are spun down, and then notifies the HDD recovery controller 250 of identification information on the spun down HDDs. For example, when the number of combinations of a sense key (SK), an additional sense code (ASC), and an additional sense code qualifier (ASCQ) constituting the sense information sent back from the HDD is equal to "02h/04h/01h" or "02h/04h/02h" ("h" denotes a hexadecimal notation), the access controller 240 determines that the HDDs are spun down.

Both of the HDD recovery controller 250 and the DE recovery controller 260 perform processing of restoring the spun down HDDs. When performing the above-described spin down recovery processing, the HDD recovery controller 250 restores the spun down HDDs. In the spin down recovery processing, processing such as separation of the HDD, a spin up request for the HDD, and re-integration of the HDD is individually performed in each spun down HDD. On the other hand, the DE recovery controller 260 restores the spun down HDDs in units of DE. The DE recovery controller 260 separates a DE group including a predetermined number or more of the spun down HDDs for a given length of time. While the DE group is separated by the DE recovery controller 260 for a given length of time, the HDDs in the separated DE are spun up by the automatic spin up processing through the IOMs.

Figure 9:
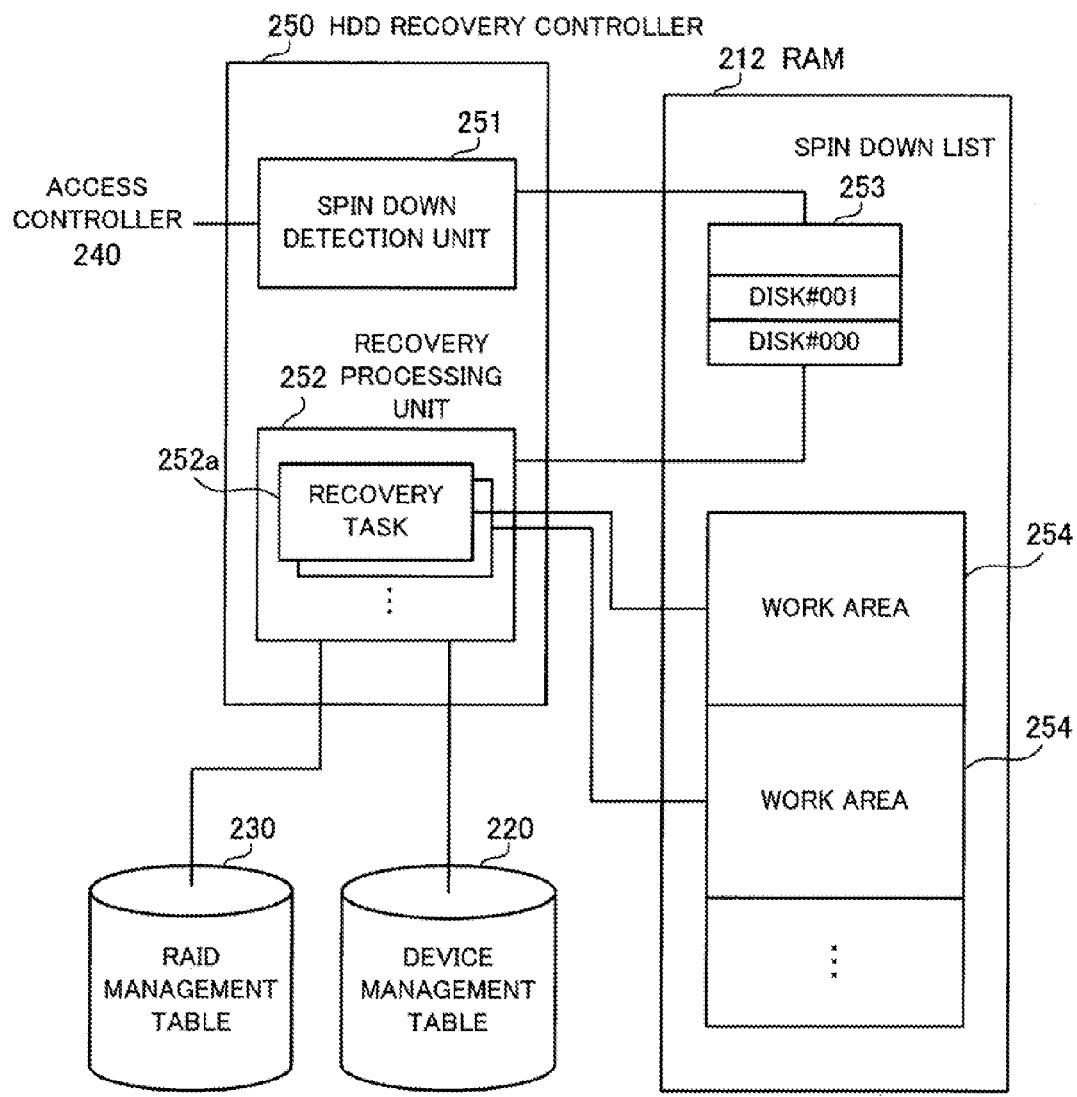
FIG. 9 illustrates an internal configuration example of an HDD recovery controller.

FIG. 9 illustrates an internal configuration example of the HDD recovery controller. The HDD recovery controller 250 includes a spin down detection unit 251 and a recovery processing unit 252.

The HDD recovery controller 250 creates a spin down list 253 in the RAM 212 of the CM 201a. When identification information on the spun down HDDs is notified by the access controller 240, the HDD recovery controller 250 registers the above information in the spin down list 253.

The recovery processing unit 252 performs the above-described spin down recovery processing with respect to each of the HDDs registered in the spin down list 253. Every time an HDD is registered in the spin down list 253, the recovery processing unit 252 starts up a recovery task 252a corresponding to the registered HDD. Further, the recovery processing unit 252 secures work areas 254 each corresponding to the started-up recovery task 252a in the RAM 212 of the CM 201a, and stores various data necessary for executing the recovery task 252a in the work area 254 corresponding to the executed recovery task 252a.

Examples of the recovery task 252a include processing of separating the HDD to be processed, processing of issuing a command for requesting the HDD to be processed to be spun up, and processing of re-integrating the HDD to be processed. Among the above processing, in the processing of separating the HDD, the "device status" corresponding to the HDD to be processed is updated from "1" to "0" in the device management table 220. At the same time, in the RAID management table 230, the "device status" corresponding to the HDD to be processed is also updated from "1" to similarly. Further, in the RAID management table 230, the "redundancy status" and the "operation propriety status" corresponding to the RAID group to which the HDD to be processed belongs are also updated, if desired.

Here, when the "operation propriety status" remains to be set to "1" even if the spun down HDDs are separated, the RAID group to which the separated HDDs belong is continued to be operated. That is, in the spin down recovery processing, the spun down HDDs are restored while the RAID group is continued to be operated as far as possible.

The recovery processing unit 252 may receive interruption from the DE recovery controller 260. As described later, at the time of causing interruption, the DE recovery controller 260 notifies the recovery processing unit 252 of information identifying the DE loop. At the time of receiving the interruption, when performing the recovery task 252a relating to the HDDs provided on the DE loop notified by the DE recovery controller 260, the recovery processing unit 252 interrupts performance of the recovery task 252a.

In addition, details of the DE recovery controller 260 of the CM 201a will be described later with reference to FIG. 13.

Figure 10:
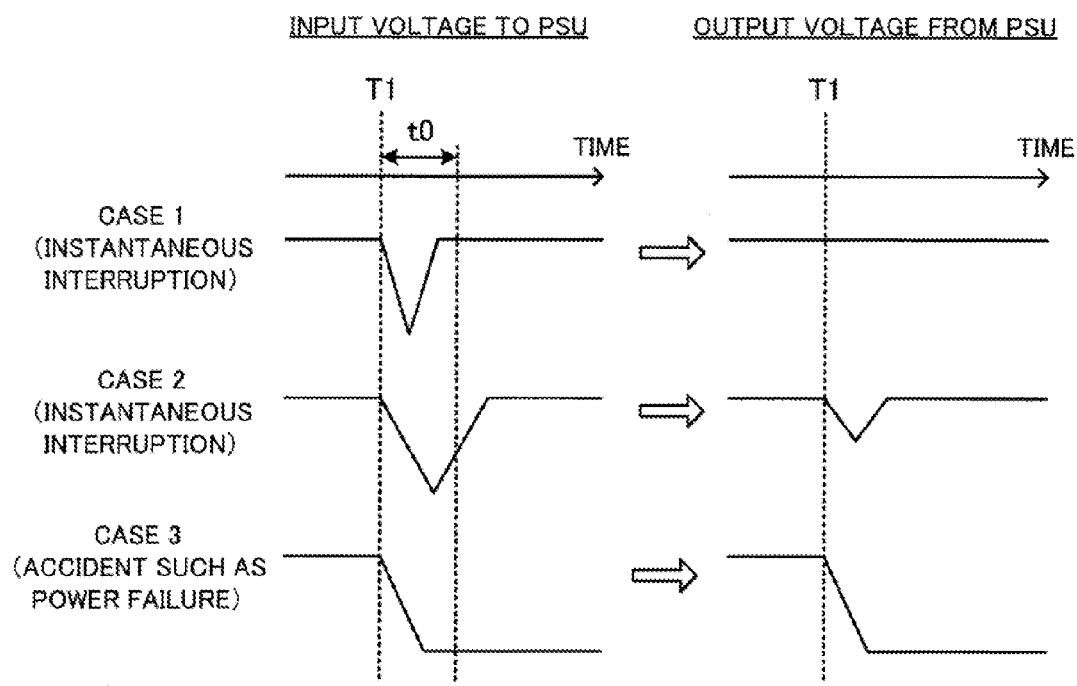
FIG. 10 illustrates a relationship between an input voltage and an output voltage of a PSU.

Next, operations of the PSU in the storage system 100 will be described. FIG. 10 illustrates a relationship between an input voltage and an output voltage of the PSU.

The PSU 202 included in the CE 200 and the PSUs 351 and 352, respectively, included in the DEs 300a to 300f convert a DC or AC power supply supplied from the outside into a DC power supply of a predetermined voltage, respectively. As described above, the PSUs 202 and 351 produce a DC power supply of 5 V, and the PSU 352 produces a DC power supply of 12 V.

Further, a power supply supplied to the PSU may be instantaneously interrupted (namely, a power supply voltage is temporarily reduced), for example, by an influence of thunder. Even in the case where a power supply supplied from the outside is instantaneously interrupted, when a time at which a power supply voltage is set to a predetermined value or less is within the predetermined time, each PSU keeps the output voltage constant. For example, when an input voltage to the PSU is reduced to a predetermined value or less at a time T1, in the case where the time at which a voltage is a predetermined value or less is equal to or less than a limit time t0 as in "case 1" of FIG. 10, an output voltage from the PSU fails to change. However, in the case where the time at which a voltage is a predetermined value or less is larger than the limit time t0 as in "case 2" and "case 3" of FIG. 10, the output voltage from the PSU is also reduced. Note, however, that in the case where the time at which the voltage is a predetermined value or less is approximate to the limit time t0 at some level as in the "case 2", the output voltage from the PSU returns, although being temporarily reduced, to an original voltage. On the contrary, in the case where the time at which the voltage is a predetermined value or less is sufficiently longer than the limit time t0 as in the "case 3", the output voltage from the PSU remains to be reduced. The above case 3 corresponds to, for example, conditions at the time of the power failure.

Figure 11:
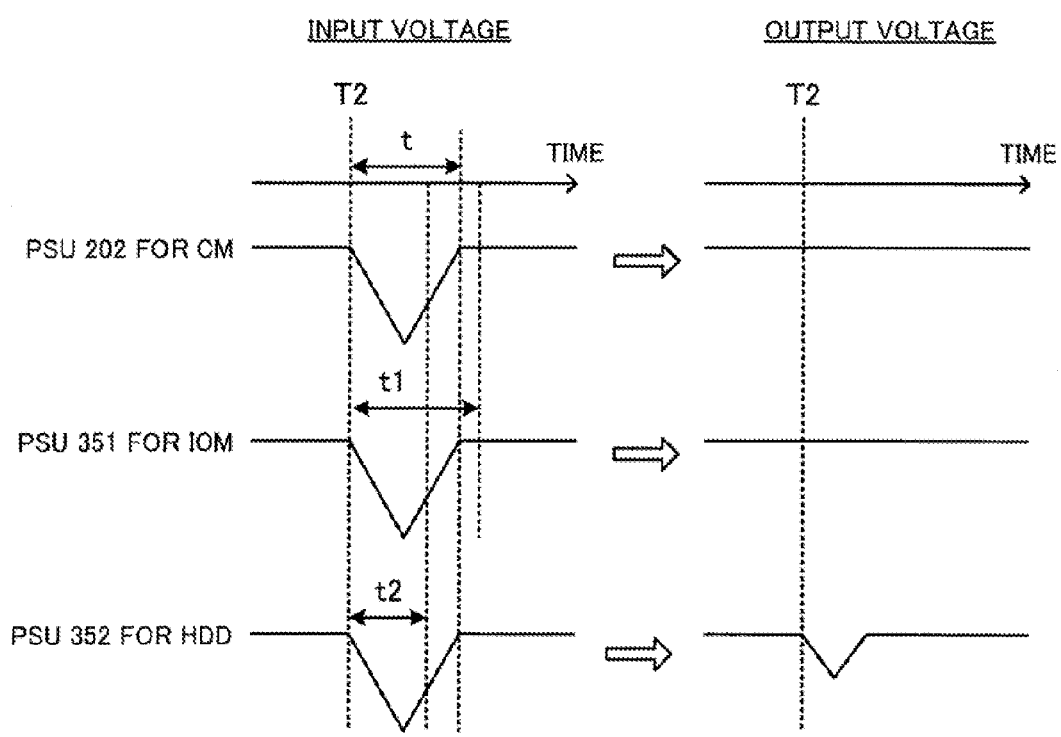
FIG. 11 illustrates a limit time for each PSU.

FIG. 11 illustrates the limit time of each PSU.

The PSUs 202 and 351 of the output voltage of 5 V differ from the PSU 352 of the output voltage of 12 V, respectively, in the limit time in which the input voltage is reduced while keeping the output voltage constant. The limit time t1 of the PSUs 202 and 351 is longer than the limit time t2 of the PSU 352.

Here, think of a case where the input voltage to each of the PSUs 202, 351, and 352 is reduced to a predetermined value or less from the time T2 for the time t. When the time t at which the input voltage is reduced to a predetermined value or less is equal to or less than the limit time t1 of the PSUs 202 and 351 and longer than the limit time t2 of the PSU 352 (t≤t1 and t>t2), although the output voltage from each of the PSUs 202 and 351 fails to change, the output voltage from the PSU 352 is temporarily reduced, as in FIG. 11.

When the output voltage from the PSU 352 is temporarily reduced, the HDD which operates by a power supply from the PSU 352 may be spun down depending on the voltage reduction time. When the output voltage from the PSU 352 in a certain DE is temporarily reduced, the plurality of the HDDs in the DE may be spun down. On the other hand, since the output voltage from the PSU 351 is not reduced in the case of FIG. 11, the IOM which operates by a power supply from the PSU 351 continues to normally operate. In the same manner, since the output voltage from the PSU 202 is also not reduced in the case of FIG. 11, the CM which operates by a power supply from the PSU 202 also continues to normally operate.

In the above case of FIG. 11, although the CM transmits a command to the HDD via the IOM, the HDD as a command transmission destination may be spun down. When the HDD as a command transmission destination is spun down, a controller circuit of the HDD as a command transmission destination sends back sense information capable of determining that the HDD is spun down to the CM as a command transmission source. Based on the sense information received from the HDD, when determining that the HDD is spun down, the access controller 240 illustrated in FIG. 8 notifies the HDD recovery controller 250 of the above effect. The notified HDD recovery controller 250 performs the above spin down recovery processing and restores the spun down HDD.

Also, the IOMs in the DE perform the "automatic spin up processing" of spinning up the HDD in the same DE. When a power supply to the HDDs from the PSU 352 is restored from a halt condition, the IOMs perform the automatic spin up processing.

Figure 12:
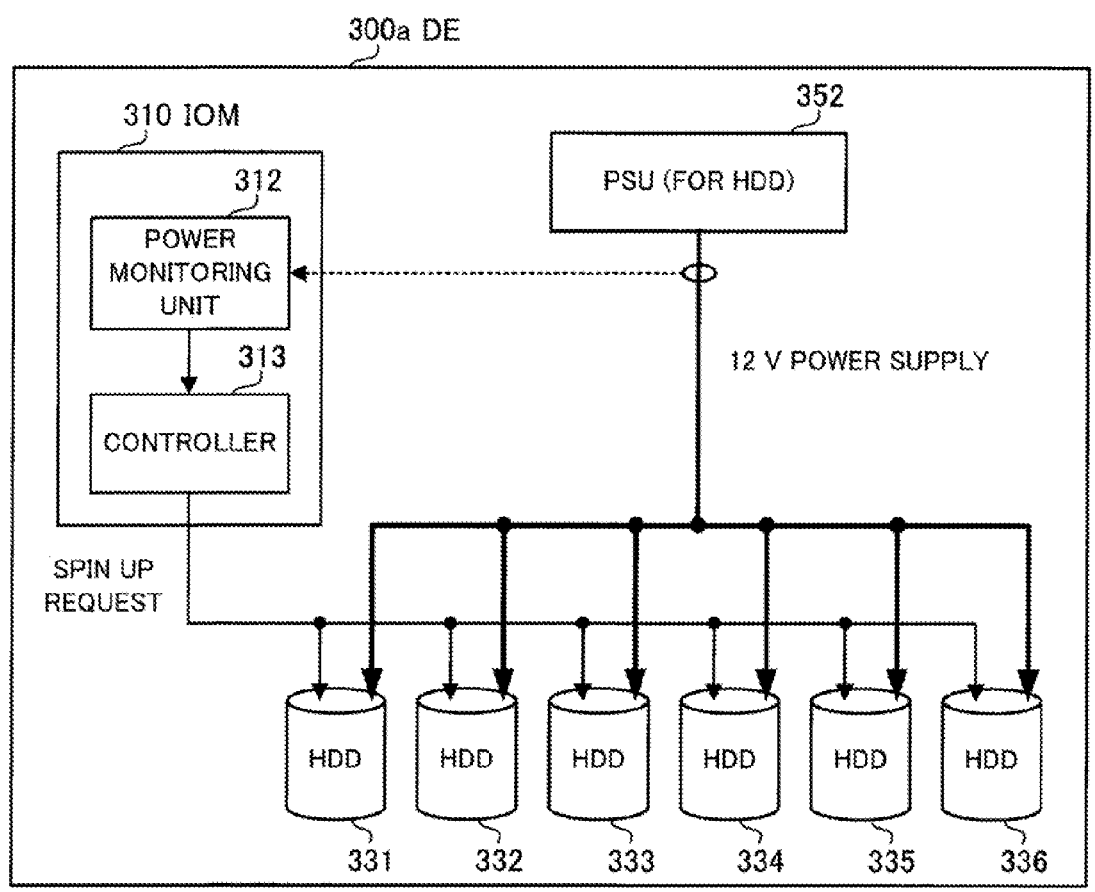
FIG. 12 illustrates automatic spin up processing.

FIG. 12 illustrates the automatic spin up processing. In FIG. 12, as an example, the automatic spin up processing in the DE 300a is illustrated.

In the DE 300a, the power monitoring unit 312 of the IOM 310 detects that a power supply voltage supplied to the HDDs 331 to 336 from the PSU 352 rises up from less than a predetermined threshold voltage to equal to or more than the threshold voltage, and then notifies the controller 313 that the power supply to the HDDs is restored.

When receiving a notification relating to a power supply restoration from the power monitoring unit 312, the controller 313 transmits a command for requesting all the HDDs 331 to 336 in the DE 300a to be spun up. In addition, an SCSI command for requesting a spin-up is a command of a code "1Bh".

Here, examples of the case in which the power monitoring unit 312 detects the power supply restoration include a case in which when the power supply to the PSU 352 from the outside is instantaneously interrupted, the output voltage from the PSU 352 is temporarily reduced as illustrated in FIG. 11, and a case in which when restored from a power failure, the power supply from the PSU 351 is resumed. In any case of the above, among the HDDs 331 to 336 in the DE 300a, the spun down HDDs are spun up according to a command from the IOM 310 without receiving a command from the CM.

Next, processing of the case in which the spin-down of the HDD is detected in the CM 201a will be described.

As illustrated in FIG. 9, at the time of accessing the HDD, in the case where the access controller 240 of the CM 201a detects that the HDD as an access destination is spun down, the HDD recovery controller 250 performs the spin down recovery processing with respect to the spun down HDD. In the case where the spin-down of the plurality of the HDDs is detected, they are registered in the spin down list 253 and the recovery task 252a is started up to each of the registered HDDs.

In the above processing of the HDD recovery controller 250, as the HDDs are more spun down, the recovery tasks 252a are more started up. Therefore, there is a problem that a processing load of the CPU 211 of the CM 201a becomes large. When the processing load of the CPU 211 of the CM 201a becomes large, an access processing speed through the access controller 240 is significantly reduced. Alternatively, the time necessary for restoring one spun down HDD becomes long.

In addition, as the recovery tasks 252a are more started up, the work areas 254 are more secured in the RAM 212. When the capacity of the RAM 212 is deficient and the work area 254 is unable to be secured, the spin down recovery processing may grow stagnant. Further, the other processing such as the access processing through the access controller 240, except the spin down recovery processing may fail to be performed.

Here, for example, when the instantaneous interruption of the power supply from the PSU 352 corresponding to the HDD causes the spin-down of the HDD, there is a high probability that the plurality of the HDDs of the DE having mounted thereon the HDD are spun down. In the above case, the access controller 240 detects that the plurality of the HDDs are spun down, and as a result, the HDD recovery controller 250 starts up a plurality of the recovery tasks 252a.

As illustrated in FIG. 11, particularly, although a power supply voltage to the IOMs is not reduced, a power supply voltage to the HDDs in the same DE is instantaneously interrupted. In the above case, the access controller 240 accesses the HDDs via the IOMs which continue to normally operate. Therefore, there is a high probability that the access controller 240 detects that the plurality of the HDDs are spun down from a response for the access.

To solve the above problem, the DE recovery controller 260 of the CM 201a counts the spun down HDDs in units of DE loop. When a count value reaches a predetermined value, the DE recovery controller 260 separates the DE including the spun down HDDs among the DEs in the DE loop for a given length of time. While the DE is separated, the IOM performs the above automatic spin up processing in the separated DE. That is, when the plurality of the spun down HDDs are restored by processing on the DE side, the plurality of the HDDs are restored without increasing a processing load of the CM 201a.

Figure 13:
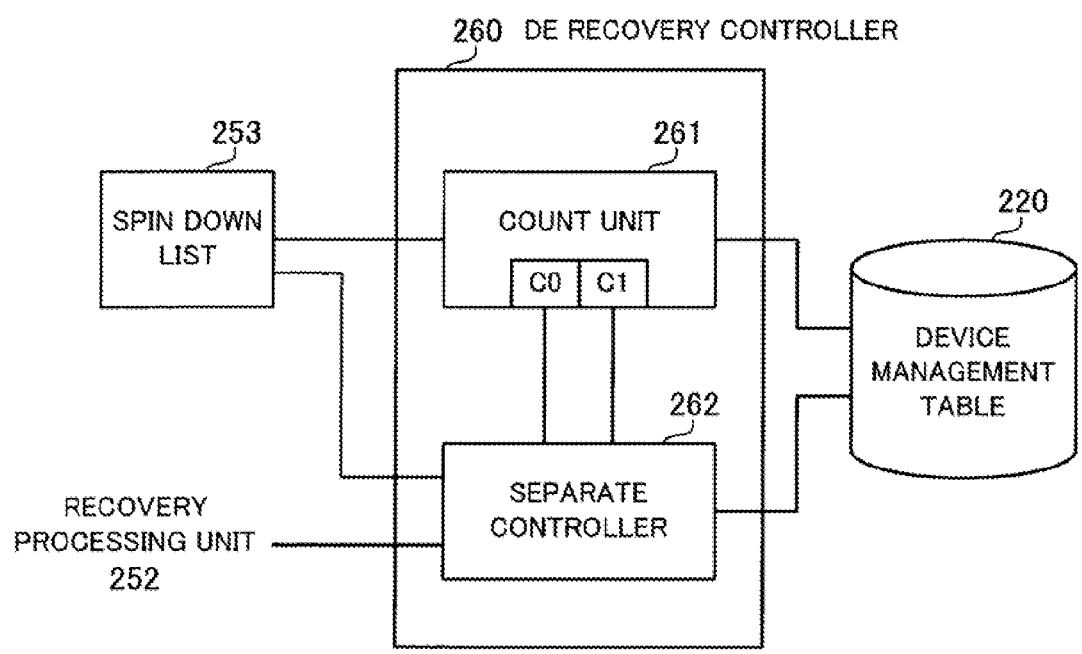
FIG. 13 illustrates an internal configuration example of a DE recovery controller.

FIG. 13 illustrates an internal configuration example of the DE recovery controller. The DE recovery controller 260 includes a count unit 261 and a separate controller 262.

The count unit 261 counts the number of the spun down HDDs for each DE loop while referring to the device management table 220. When counting the number of the HDDs registered in the spin down list 253, the count unit 261 determines the number of the spun down HDDs. In the present embodiment, the count unit 261 counts a count value C0 relating to the DE loop including the DEs 300a to 300c and a count value C1 relating to the DE loop including the DEs 300d to 300f. The count values C0 and C1 are stored, for example, in the RAM 212 of the CM 201a.

When the count value through the count unit 261 reaches a predetermined value, the separate controller 262 separates the DE including the spun down HDDs from the CM 201a among the DEs included in the DE loop corresponding to the count value. At this time, the separate controller 262 separates only the IOM of the DE nearest to the CM 201a among the DEs including the spun down HDDs. Further, the separate controller 262 performs interruption processing with respect to the recovery processing unit 252 of the HDD recovery controller 250, and interrupts the recovery task 252a relating to the HDDs included in the separated DE.

When the count value reaches a predetermined value and then a predetermined period of time elapses, the separate controller 262 re-integrates the separated DE. At this time, the separate controller 262 requests the recovery processing unit 252 of the HDD recovery controller 250 to rebuild the RAID relating to the HDDs in which the recovery task 252a is interrupted. In addition, the separate controller 262 clears the HDDs included in the re-integrated DE from the spin down list 253.

Figure 14:
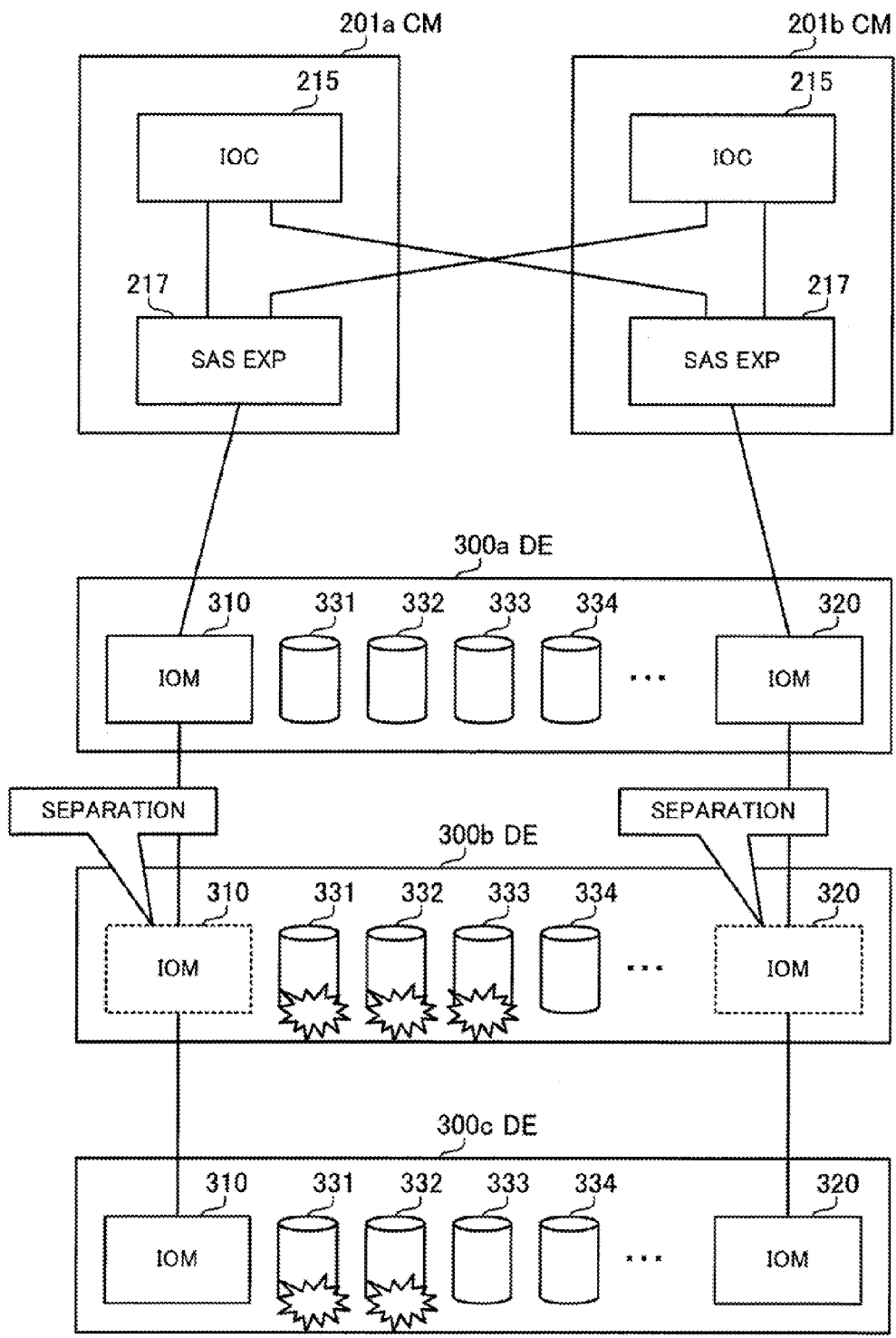
FIG. 14 illustrates an example of processing through a separate controller.

Here, FIG. 14 illustrates an example of processing through the separate controller.

In FIG. 14, the number of the spun down HDDs reaches a predetermined threshold among the HDDs in the DEs 300a to 300c constituting the DE loop. Suppose, for example, that in FIG. 14, the HDDs 331 to 333 in the DE 300b and the HDDs 331 and 332 in the DE 300c are spun down.

At this time, the separate controller 262 of the CM 201a separates the IOMs 310 and 320 provided on the DE 300b nearest to the CM 201a among the DEs having mounted thereon the spun down HDDs. This process permits the DEs 300b and 300c not to be permitted to be used. However, the CMs 201a and 201b access the HDDs of the DE 300a, and therefore operation of the storage system 100 is continued as far as possible.

Figure 15:
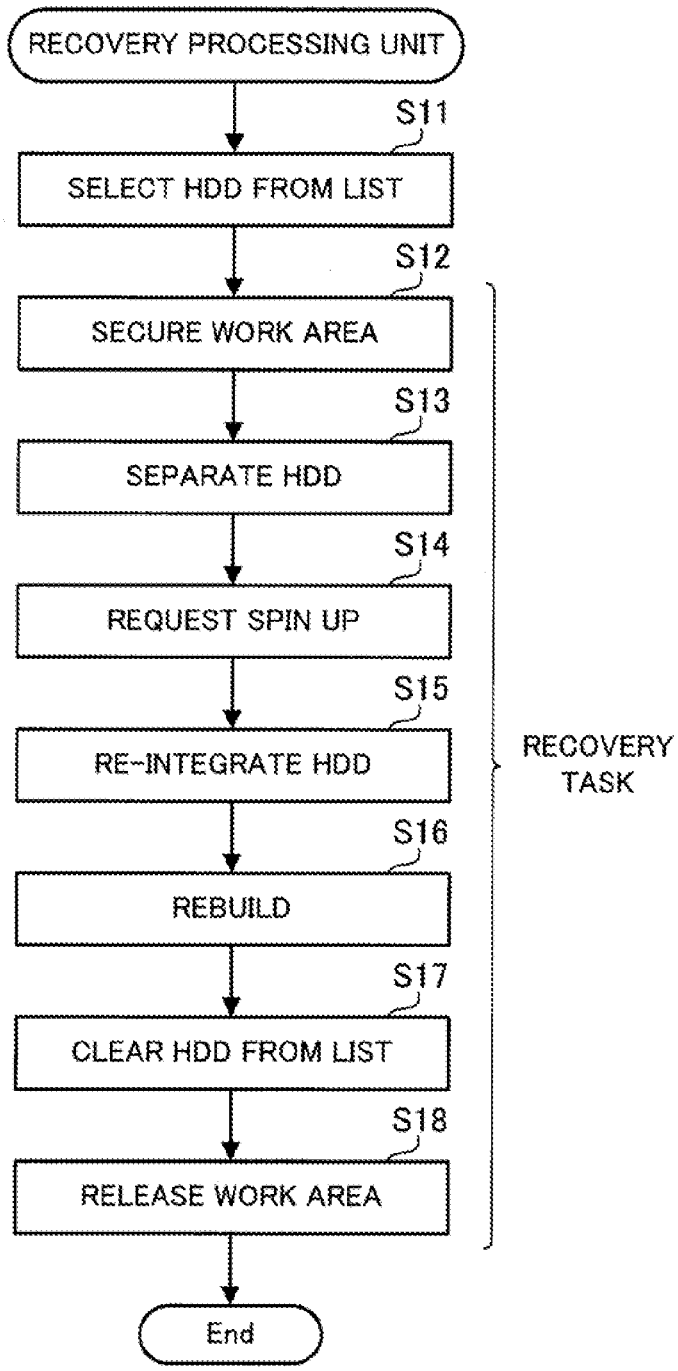
FIG. 15 is a flowchart illustrating an example of a processing procedure for a recovery processing unit of an HDD recovery controller.

Next, processing of the HDD recovery controller 250 and DE recovery controller 260 of the CM 201a will be described with reference to a flowchart. First, FIG. 15 is a flowchart illustrating an example of a processing procedure of a recovery processing unit of the HDD recovery controller.

(Step S11) When the spin down detection unit 251 of the CM 201a registers a new HDD in the spin down list 253, the recovery processing unit 252 of the CM 201a selects the HDD newly registered in the spin down list 253. The recovery processing unit 252 performs the recovery task 252a (processing of steps S12 to S18) relating to the selected HDD.

(Step S12) The recovery processing unit 252 secures the work area 254 in the RAM 212 of the CM 201a. The recovery processing unit 252 performs processing of the next step S13 and subsequent steps by using the secured work area 254.

(Step S13) In the device management table 220, the recovery processing unit 252 updates the "device status" associated with the HDD selected at step S11 from "1" to "0", thereby separating the HDD. In the RAID management table 230, the recovery processing unit 252 further updates the "device status" associated with the separated HDD from "1" to "0". At this time, based on the "RAID level" associated with the RAID group to which the separated HDD belongs and the "device status" relating to the other HDDs belonging to this RAID group, the recovery processing unit 252 updates the "redundancy status" and "operation propriety status" associated with this RAID group, if desired.

For example, when the "RAID level" is set to any one of the RAIDs 1, 4, and 5, in the case where the "device status" is set to 1 with regard to all of the other HDDs belonging to the same RAID group as that of the separated HDD, the recovery processing unit 252 updates the "redundancy status" to "0", and on the other hand, keeps the "operation propriety status" to be "1". The above process permits the operation of the RAID group to be continued with the separated HDD failing to be used.

Further, in the case where even one HDD having the "device status" of "0" is present among the other HDDs belonging to the same RAID group as that of the HDD the "device status" of which is updated to "0", the recovery processing unit 252 updates the "operation propriety status" from "1" to "0". The above process permits the operation of the RAID group to be stopped. Note that if the "operation propriety status" is already updated to "0", the recovery processing unit 252 does not update the "operation propriety status" of "0" as it is.

(Step S14) The recovery processing unit 252 transmits a command for requesting the spin-up to the HDD separated at step S13, thus spinning up the separated HDD.

(Step S15) In the device management table 220, the recovery processing unit 252 updates the "device status" associated with the HDD separated at step S13 from "0" to "1", thereby re-integrating the separated HDD. In the RAID management table 230, the recovery processing unit 252 further updates the "device status" associated with the HDD separated at step S13 from "0" to "1".

(Step S16) The recovery processing unit 252 updates the "device status" of the RAID management table 220 at step S15. Through the above update processing, in the RAID group to which the re-integrated HDD belongs, the recovery processing unit 252 performs rebuild processing in the case where data is moved from a state without redundancy to a state with redundancy. In the rebuild processing, with relation to data in the logical volume belonging to the RAID group, the recovery processing unit 252 copies data and recalculates parity, thus bringing the redundancy into a latest record data in the logical volume. In addition, the rebuild processing is performed at least when the "redundancy status" and "operation propriety status" associated with the RAID group to which the re-integrated HDD belongs are set to "0" and "1", respectively.

In the case of the RAID 1, for example, in the rebuild processing, data is copied from one integrated HDD to the other re-integrated HDD. On the other hand, in the case of the RAIDs 4 and 5, in the rebuild processing, parity is recalculated and data is rearranged. After completion of the rebuild processing, in the RAID management table 230, the recovery processing unit 252 updates the "redundancy status" associated with the RAID group to which the re-integrated HDD belongs from "0" to "1".

When the HDD is re-integrated at step S15, the operation of the RAID group is resumed in the state where the data has no redundancy. In the above case, in the RAID management table 230, the recovery processing unit 252 updates the "operation propriety status" associated with the RAID group to which the re-integrated HDD belongs from "0" to "1". At this time, the "redundancy status" associated with the same RAID group remains to be set to "0".

Even if the HDD is re-integrated at step S15, when the redundancy is not brought into data in the RAID group to which the re-integrated HDD belongs, processing of step S16 is skipped. In this case, both of the "redundancy status" and "operation propriety status" associated with the RAID group to which the re-integrated HDD belongs remain to be set to "0".

(Step S17) The recovery processing unit 252 clears the re-integrated HDD from the spin down list 253.

(Step S18) The recovery processing unit 252 releases the work area 254 secured at step S12, and terminates the recovery task 252a.

When the HDD recovery controller 250 receives an interruption from the separate controller 262 of the DE recovery controller 260, the recovery processing unit 252 interrupts performance of the recovery task.

Figure 16:
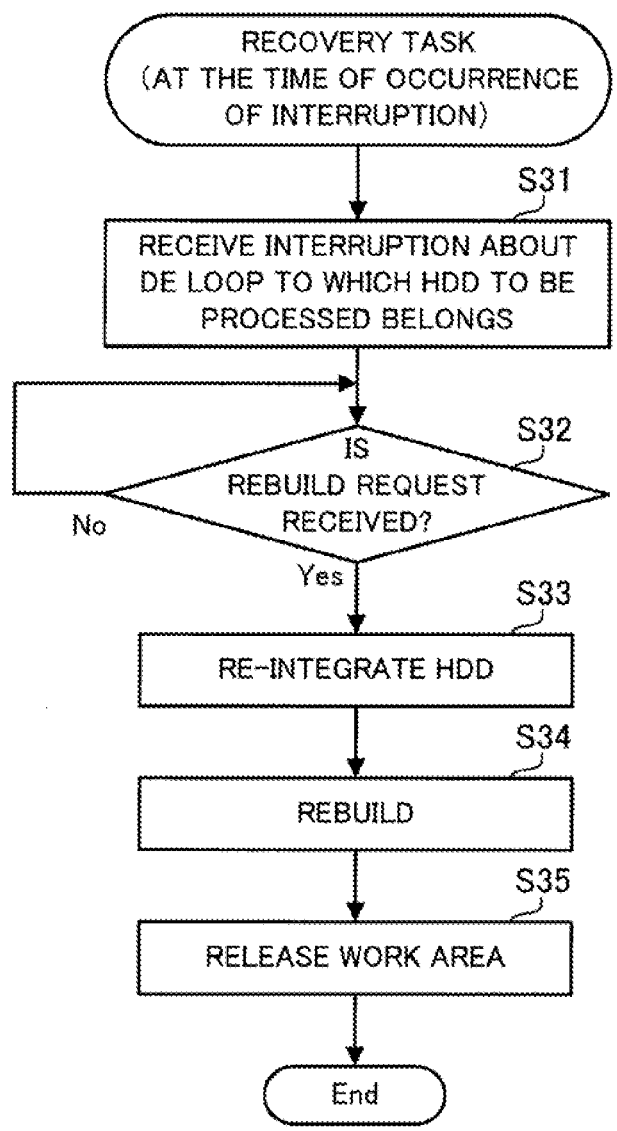
FIG. 16 is a flowchart illustrating an example of a processing procedure for a recovery task at the time of occurrence of interruption.

Here, FIG. 16 is a flowchart illustrating an example of a processing procedure of the recovery task at the time of occurrence of the interruption. Note that the processing of FIG. 16 is performed in each HDD to be performed of the recovery task 252a.

(Step S31) While performing the recovery task 252a in which one certain HDD is to be processed, when receiving from the separate controller 262 an interruption in which the DE loop to which the HDD to be processed belongs is specified, the recovery processing unit 252 interrupts performance of the recovery task 252a.

(Step S32) The recovery processing unit 252 monitors a rebuild request from the separate controller 262. The rebuild request is information for notifying the recovery processing unit 252 that the interruption is cleared. When receiving the rebuild request in which the DE loop to which the HDD to be processed at step S31 belongs is specified (Yes at step S32), the recovery processing unit 252 performs processing of step S33.

(Steps S33 to S35) Processing of steps S33 to S35 is processing left in the interrupted recovery task 252a. The processing of steps S33, S34, and S35 is performed in the same manner as in that of steps of S15, S16, and S18 of FIG. 15, respectively. Note that the processing of steps S33 to S35 is appropriately skipped depending on the timing at which the interruption is received.

For example, when the interruption is received before the performance at step S12 of FIG. 15, the processing of steps S33 to S35 is skipped. When the interruption is received at a stage where the processing up to step S12 of FIG. 15 is performed, the processing of steps S33 and S34 is skipped. When the interruption is received at the stage where the processing up to step S13 of FIG. 15 is performed, the processing of steps S33 to S35 is performed without the skip.

Figure 17:
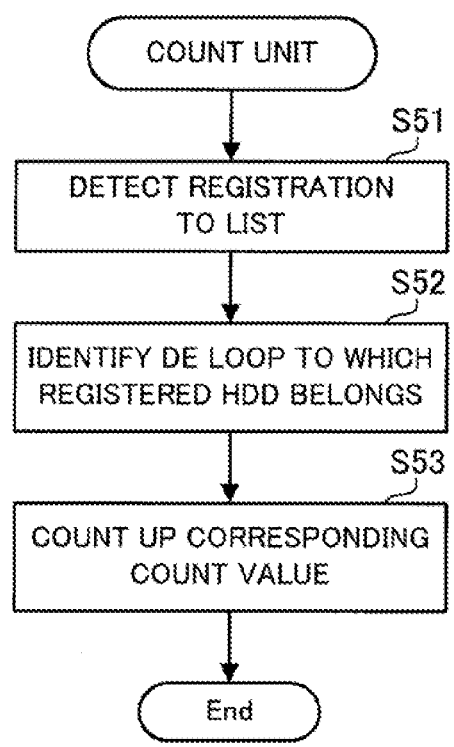
FIG. 17 is a flowchart illustrating an example of a processing procedure for a count unit of a DE recovery controller.

Next, FIG. 17 is a flowchart illustrating an example of a processing procedure of the count unit of the DE recovery controller.

(Step S51) When detecting that a new HDD is registered in the spin down list 253, the count unit 261 of the CM 201a performs processing of step S52.

(Step S52) Based on the device management table 220, the count unit 261 identifies the DE having mounted thereon the HDD newly registered in the spin down list 253 at step S51. Based on the device management table 220, the count unit 261 further identifies the DE loop to which the identified DE belongs.

(Step S53) The count unit 261 counts up by "1" a count value corresponding to the DE loop identified at step S52. When the DE loop identified at step S52 includes the DEs 300a to 300c, the count unit 261 counts up the count value C0 of FIG. 13. On the other hand, when the DE loop identified at step S52 includes the DEs 300d to 300f, the count unit 261 counts up the count value C1 of FIG. 13.

Figure 18:
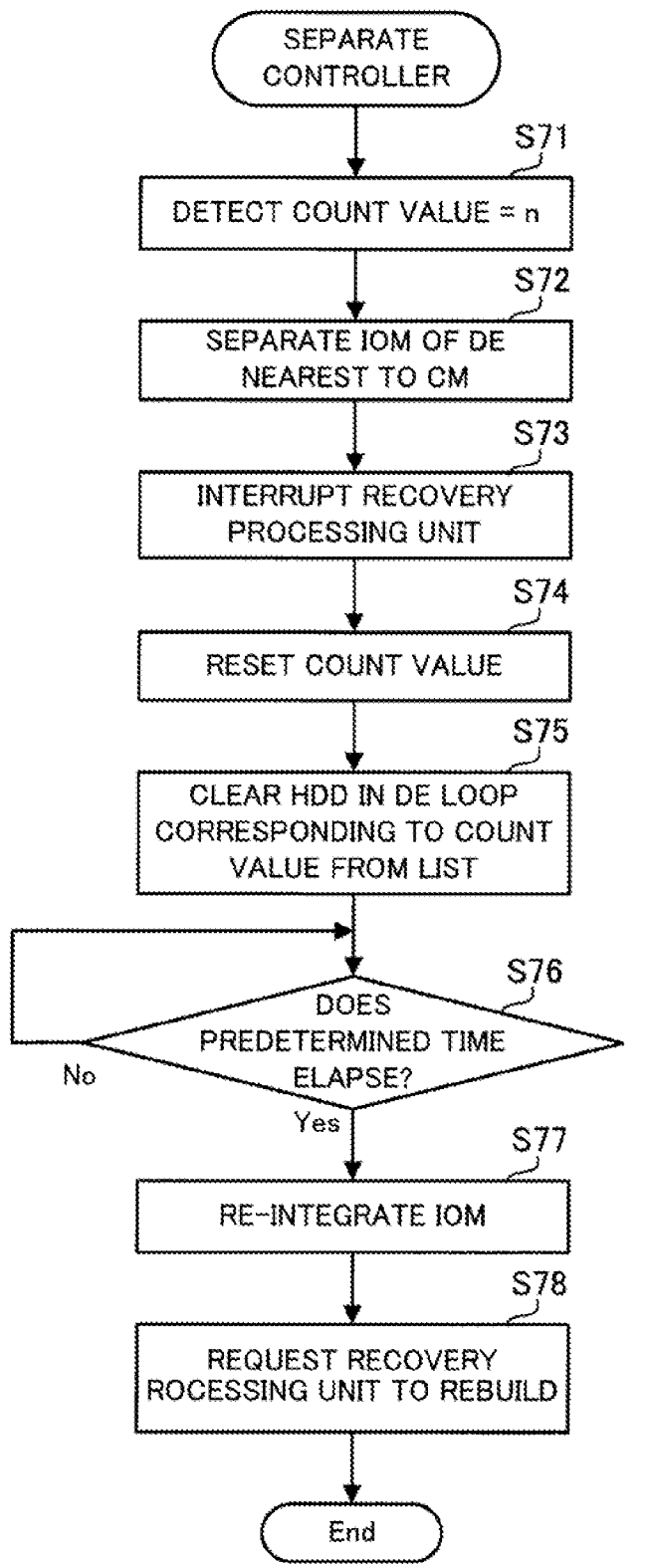
FIG. 18 is a flowchart illustrating an example of a processing procedure for a separate controller of a DE recovery controller.

FIG. 18 is a flowchart illustrating an example of a processing procedure of the separate controller of the DE recovery controller. The processing of FIG. 18 is performed with respect to each of the count values C0 and C1.

(Step S71) When detecting that the count value (e.g., the count value C0) to be monitored reaches a threshold n, the separate controller 262 of the CM 201a performs processing of step S72.

(Step S72) The separate controller 262 identifies the DEs having mounted thereon the spun down HDDs among the DEs belonging to the DE loop corresponding to the count value to be monitored, and separates the IOMs in the DE nearest to the CM 201a from among the identified DEs. The above processing is performed, for example, as follows.

Based on the device management table 220, the separate controller 262 identifies the HDDs in the DE loop corresponding to the count value to be monitored among the HDDs registered in the spin down list 253. In this processing, the separate controller 262 reads in the HDDs registered in the spin down list 253 one by one, and based on the device management table 220, identifies the DE having mounted thereon the read-in HDDs, and further identifies the DE loop to which the identified DE belongs. The separate controller 262 determines whether the identified DE loop corresponds to the count value to be monitored.

Next, based on the device management table 220, the separate controller 262 identifies the DE nearest to the CM 201a among the DEs having mounted thereon the identified HDDs. Among the DEs having mounted thereon the identified HDDs, for example, the DE at a highest stage registered in the device management table 220 is nearest to the CM 201a.

Next, in the device management table 220, the separate controller 262 updates the "device status" associated with the IOMs in the identified DE from "1" to "0". Through the above process, the IOMs in the identified DE are separated. The access controller 240 is further unable to access the HDDs in the DE having mounted thereon the separated IOMs and the HDDs in the DE serially connected to the separated IOMs.

(Step S73) The separate controller 262 performs interruption in which the DE loop corresponding to the count value to be monitored is specified with respect to the recovery processing unit 252. As illustrated in FIG. 16, the recovery processing unit 252 which receives the interruption interrupts the performance of the recovery task 252a in the case of performing the recovery task 252a relating to the HDDs in the specified DE loop.

(Step S74) The separate controller 262 resets the count value to be monitored to "0".

(Step S75) Among the HDDs registered in the spin down list 253, the separate controller 262 clears from the spin down list 253 the HDDs in the DE loop corresponding to the count value to be monitored. At this time, the separate controller 262 clears n pieces of HDDs from the spin down list 253.

(Step S76) After detecting at step S71 that the count value reaches a threshold n, the separate controller 262 waits for the elapse of a predetermined time. When the predetermined time then elapses (Yes at step S76), the separate controller 262 performs processing of step S77.

The elapsed time to be monitored at step S76 is set to equal to or more than the time that the IOMs in the DE detect a return of a voltage supplied to the HDDs and then the automatic spin up processing is completed. While the separate controller 262 waits for the elapse of the predetermined time, the IOMs separated at step S72 and the IOMs in the DE serially connected to the above IOMs perform the automatic spin up processing, respectively. When the HDDs are spun down in the plurality of the DEs in the same DE loop, the IOMs respectively included in the plurality of the DEs perform the automatic spin up processing in parallel. When the separate controller 262 then determines at step S76 that the predetermined time elapses, all the HDDs in the same DE as that of the IOMs separated at step S72 and all the HDDs in the DE serially connected to the separated IOMs are spun up.

(Step S77) In the device management table 220, the separate controller 262 updates the "device status" relating to the IOMs separated at step S72 from "0" to "1", thereby re-integrating the separated IOMs.

In addition, the above processing of steps S74 and S75 may be performed at any timing during the period after detecting at step S71 that the count value reaches the threshold n and before starting performance of the re-integration processing at step S77.

(Step S78) The separate controller 262 requests the recovery processing unit 252 to perform the rebuild processing in which the DE loop corresponding to the count value to be monitored is specified, and releases the interruption. The recovery processing unit 252 which receives the rebuild request performs the processing illustrated at steps S33 to S35 of FIG. 16. Through the above steps, the recovery processing unit 252 re-integrates the HDDs separated by starting the performance of the recovery task 252a. When re-integrating the HDDs, the CM 201a may bring the redundancy into data in the RAID group which is operated while the "redundancy status" remains to be "0", or resume the operation of the RAID group in which the operation is stopped.

In the storage system 100 described above, in the case where the plurality of the HDDs are spun down by a break of the power supply, the HDDs are spun up based on not processing of the CM side but processing of the IOMs mounted on the same DE as that of the spun down HDDs. In the case where the plurality of the HDDs are spun down, the CM mainly performs simple processing such as the separation and re-integration of the IOMs (specifically, update of the "device status").

Specifically, the IOMs spin up the HDDs without significantly increasing a processing load of the CM even when the plurality of the HDDs are spun down. When alleviating the processing load for spinning up the HDDs, while restoring the HDDs, the CM continues access processing through the access controller 240 to the HDDs in the unseparated DE. As a result, operation continuity of the system is improved. The CM further spins up the HDDs and reduces the time so that the operation of the RAID group may be resumed by using the spun up HDDs.

On the other hand, when a small number of the HDDs are spun down, restoration processing is performed in units of the HDD by processing of the recovery processing unit 252 of the CM. In the restoration processing through the DE recovery controller 260, since separation occurs in units of the DE, the CM may fail to access the HDDs which are not spun down. As compared with the above case, the recovery processing unit 252 performs the restoration processing in units of the HDD. Therefore, for example, when the HDD is temporarily spun down due to a small malfunction of the individual HDD, the CM restores the spun down HDD while continuing the operation of the RAID.

After breaking a power supply to the entire system over a relatively long time due to a power failure, for example, even when the power supply is restored, the storage system 100 restores the HDDs in the DE 300a to 300f in a short amount of time without increasing a processing load of the CM.

As can be seen from various embodiments discussed above, the proposed storage system and storage control method permit a processing load of a control apparatus to be alleviated at the time when a number of magnetic disk drives are spun down.

In addition, the proposed storage control apparatus permits a processing load to be alleviated at the time when a number of magnetic disk drives are spun down.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions and alterations could be made hereto without departing from the spirit and scope of the invention.

What is claimed is:

1. A storage system comprising:
a magnetic disk apparatus including a plurality of magnetic disk drives; and
a control apparatus which controls an access to a magnetic disk drive in the magnetic disk apparatus,
wherein:
the magnetic disk apparatus has a first spin up controller which spins up a spun down magnetic disk drive in the magnetic disk apparatus; and
the control apparatus has:
a second spin up controller which spins up a spun down magnetic disk drive in the magnetic disk apparatus; and
a separate controller which does not permit the magnetic disk apparatus to be used and prevents the second spin up controller from spinning up the spun down magnetic disk drive in the magnetic disk apparatus when the number of the spun down magnetic disk drives in the magnetic disk apparatus reaches a predetermined threshold, and permits the magnetic disk apparatus to be used and permits the second spin UP controller to spin UP the spun down magnetic disk drive in the magnetic disk apparatus after a predetermined period of time.

2. The storage system according to claim 1, wherein when detecting that a power supply voltage supplied to all the magnetic disk drives in the magnetic disk apparatus rises up from less than a predetermined threshold voltage to equal to or more than the threshold voltage, the first spin up controller requests the magnetic disk drive in the magnetic disk apparatus to be spun up.

3. The storage system according to claim 1, wherein when the number of the spun down magnetic disk drives in the magnetic disk apparatus reaches the threshold, the separate controller does not permit an interface circuit communicating with the control apparatus included in the magnetic disk apparatus to be used.

4. The storage system according to claim 1, wherein:
based on a response for an access to a magnetic disk drive in the magnetic disk apparatus, when determining that a magnetic disk drive as an access destination is spun down, the second spin up controller spins up the magnetic disk drive as an access destination; and
when the number of the magnetic disk drives determined to be spun down by the second spin up controller reaches the threshold, the separate controller does not permit the magnetic disk apparatus to be used.

5. The storage system according to claim 1, wherein:
to the control apparatus, a plurality of the magnetic disk apparatus each including a plurality of the magnetic disk drives and the first spin up controller are serially connected; and
when the number of the spun down magnetic disk drives in the plurality of the magnetic disk apparatus reaches the threshold, the separate controller does not permit a magnetic disk apparatus nearest to the control apparatus to be used among the magnetic disk apparatus including the spun down magnetic disk drives in the plurality of the magnetic disk apparatus.

6. The storage system according to claim 5, wherein when the number of the spun down magnetic disk drives in the plurality of the magnetic disk apparatus reaches the threshold, the separate controller does not permit an interface circuit communicating with the control apparatus included in a magnetic disk apparatus nearest to the control apparatus to be used among the magnetic disk apparatus including the spun down magnetic disk drives in the plurality of the magnetic disk apparatus.

7. A storage control apparatus which is connected to a magnetic disk apparatus including a plurality of magnetic disk drives and controls an access to a magnetic disk drive in the magnetic disk apparatus, the storage control apparatus comprising:
a spin up controller which spins up a spun down magnetic disk drive in the magnetic disk apparatus; and
a separate controller which does not permit the magnetic disk apparatus to be used and prevents the spin up controller from spinning up the spun down magnetic disk drive in the magnetic disk apparatus when the number of the spun down magnetic disk drives in the magnetic disk apparatus reaches a predetermined threshold, and which permits the magnetic disk apparatus to be used and permits the spin UP controller to spin UP the spun down magnetic disk drive in the magnetic disk apparatus after a predetermined time equal to or more than a necessary time that elapses before the magnetic disk apparatus spins up the spun down magnetic disk drives in the magnetic disk apparatus.

8. The storage control apparatus according to claim 7, wherein when the number of the spun down magnetic disk drives in the magnetic disk apparatus reaches the threshold, the separate controller does not permit an interface circuit communicating with the control apparatus included in the magnetic disk apparatus to be used.

9. The storage control apparatus according to claim 7, wherein:
based on a response for an access to a magnetic disk drive in the magnetic disk apparatus, when determining that a magnetic disk drive as an access destination is spun down, the spin up controller spins up the magnetic disk drive as an access destination; and
when the number of the magnetic disk drives determined to be spun down by the spin up controller reaches the threshold, the separate controller does not permit the magnetic disk apparatus to be used.

10. The storage control apparatus according to claim 7, wherein:
to the storage control apparatus, a plurality of magnetic disk apparatus each including a plurality of magnetic disk drives are serially connected; and
when the number of the spun down magnetic disk drives in the plurality of the magnetic disk apparatus reaches the threshold, the separate controller does not permit a magnetic disk apparatus nearest to the storage control apparatus to be used among the magnetic disk apparatus including the spun down magnetic disk drives in the plurality of the magnetic disk apparatus.

11. The storage control apparatus according to claim 10, wherein when the number of the spun down magnetic disk drives in the plurality of the magnetic disk apparatus reaches the threshold, the separate controller does not permit an interface circuit communicating with the storage control apparatus included in a magnetic disk apparatus nearest to the storage control apparatus to be used among the magnetic disk apparatus including the spun down magnetic disk drives in the plurality of the magnetic disk apparatus.

12. A storage control method for use in a storage system comprising a magnetic disk apparatus including a plurality of magnetic disk drives and a control apparatus which controls an access to a magnetic disk drive in the magnetic disk apparatus, the storage control method comprising:
causing the control apparatus to spin up a spun down magnetic disk drive in the magnetic disk apparatus;
causing the magnetic disk apparatus to spin up a spun down magnetic disk drive in the magnetic disk apparatus; and
causing the control apparatus not to permit the magnetic disk apparatus to be used and to get into a state prevented from spinning UP the spun down magnetic disk drive in the magnetic disk apparatus and causing the magnetic disk apparatus to spin UP the spun down magnetic disk drive in the magnetic disk apparatus when the number of the spun down magnetic disk drives in the magnetic disk apparatus reaches a predetermined threshold, and causing the control apparatus to permit the magnetic disk apparatus to be used and to get into a state permitted to spin up the spun down magnetic disk drive in the magnetic disk apparatus after a predetermined period of time.

13. The storage control method according to claim 12, wherein when detecting that a power supply voltage supplied to all the magnetic disk drives in the magnetic disk apparatus rises up from less than a predetermined threshold voltage to equal to or more than the threshold voltage, the magnetic disk apparatus requests the magnetic disk drive in the magnetic disk apparatus to be spun up.

14. The storage control method according to claim 12, wherein when the number of the spun down magnetic disk drives in the magnetic disk apparatus reaches the threshold, the control apparatus does not permit an interface circuit communicating with the control apparatus included in the magnetic disk apparatus to be used.

15. The storage control method according to claim 12, wherein:
  based on a response for an access to a magnetic disk drive in the magnetic disk apparatus, when determining that a magnetic disk drive as an access destination is spun down, the control apparatus spins up the magnetic disk drive as an access destination; and
  when the number of the magnetic disk drives determined to be spun down based on the response reaches the threshold, the control apparatus does not permit the magnetic disk apparatus to be used.

16. The storage control method according to claim 12, wherein:
  to the control apparatus, a plurality of the magnetic disk apparatus each including a plurality of the magnetic disk drives are serially connected; and
  when the number of the spun down magnetic disk drives in the plurality of the magnetic disk apparatus reaches the threshold, the control apparatus does not permit a magnetic disk apparatus nearest to the control apparatus to be used among the magnetic disk apparatus including the spun down magnetic disk drives in the plurality of the magnetic disk apparatus.

17. The storage control method according to claim 16, wherein when the number of the spun down magnetic disk drives in the plurality of the magnetic disk apparatus reaches the threshold, the control apparatus does not permit an interface circuit communicating with the control apparatus included in a magnetic disk apparatus nearest to the control apparatus to be used among the magnetic disk apparatus including the spun down magnetic disk drives in the plurality of the magnetic disk apparatus.

* * * * *